(12) United States Patent
Grajcar et al.

(10) Patent No.: US 11,051,495 B2
(45) Date of Patent: Jul. 6, 2021

(54) SYSTEMS AND METHODS FOR PROMOTING BIOLOGICAL RESPONSES IN INCUBATED EGGS

(71) Applicant: SIGNIFY NORTH AMERICA CORPORATION, Somerset, NJ (US)

(72) Inventors: Zdenko Grajcar, Orono, MN (US); Kevin Payne, Brecksville, OH (US); Karol Licko, Plymouth, MN (US); Peter Simko, Mound, MN (US); Josef Hoffmann, Eden Prairie, MN (US)

(73) Assignee: SIGNIFY NORTH AMERICA CORPORATION, Somerset, NJ (US)

( * ) Notice: Subject to any disclaimer, the term of this patent is extended or adjusted under 35 U.S.C. 154(b) by 537 days.

(21) Appl. No.: 15/265,165

(22) Filed: Sep. 14, 2016

(65) Prior Publication Data
US 2017/0071166 A1 Mar. 16, 2017

Related U.S. Application Data

(60) Provisional application No. 62/218,818, filed on Sep. 15, 2015, provisional application No. 62/274,929, (Continued)

(51) Int. Cl.
*A01K 41/00* (2006.01)
*F21K 9/20* (2016.01)
(Continued)

(52) U.S. Cl.
CPC ............ *A01K 41/00* (2013.01); *A01K 41/023* (2013.01); *A01K 41/06* (2013.01); *A01K 45/007* (2013.01);
(Continued)

(58) Field of Classification Search
CPC ...... A01K 41/00; A01K 41/02; A01K 41/023; A01K 41/026; A01K 41/04; A01K 41/06; A01K 41/065; A01K 45/007
(Continued)

(56) References Cited

U.S. PATENT DOCUMENTS 798,697 A 9/1905 Perkins et al.
1,009,828 A 11/1911 Clark
(Continued)

FOREIGN PATENT DOCUMENTS

FR 2557768 A1 * 1/1984 ............. A01K 67/00
GB 2032752 A * 7/1979 ............. A01K 41/00
(Continued)

OTHER PUBLICATIONS

"International Application Serial No. PCT/US2016/051607, Invitation to Pay Add'l Fees and Partial Search Report dated Nov. 21, 2016", 2 pgs.
(Continued)

*Primary Examiner* — Ebony E Evans

(57) ABSTRACT

A system and method to promote biological responses within incubated eggs using lighting devices within an incubation chamber. A light supporting device is installed within the incubation chamber in spaced relation to an incubation device housing a plurality of eggs. The light supporting device is positioned to direct light at pre-determined wavelengths into the interior cavity of the incubation device to irradiate the plurality of eggs to promote a biological response within the eggs.

24 Claims, 16 Drawing Sheets

Related U.S. Application Data filed on Jan. 5, 2016, provisional application No. 62/297,322, filed on Feb. 19, 2016.

(51) Int. Cl.
*A01K 41/02* (2006.01)
*A01K 41/06* (2006.01)
*A01K 45/00* (2006.01)

(52) U.S. Cl.
CPC ............. *F21K 9/20* (2016.08); *A01K 41/02* (2013.01); *Y02B 20/40* (2013.01)

(58) Field of Classification Search
USPC ........................................................ 119/300
See application file for complete search history.

(56) References Cited

U.S. PATENT DOCUMENTS

| | | | | |
|---|---|---|---|---|
| 1,785,421 A | * | 12/1930 | Nielsen | B60B 33/021 16/35 R |
| 1,846,756 A | | 2/1932 | Robbins | |
| 1,895,042 A | * | 1/1933 | Long | 119/318 |
| 1,911,249 A | * | 5/1933 | Stover | 119/318 |
| 1,943,575 A | | 1/1934 | Abendroth | |
| 1,977,905 A | | 10/1934 | Bohmker | |
| 2,002,880 A | * | 5/1935 | Brace | A01K 41/04 119/319 |
| 2,192,276 A | * | 3/1940 | Schaefer | G05D 23/27539 119/319 |
| 2,403,705 A | | 7/1946 | Ely | |
| 2,526,939 A | * | 10/1950 | Edwards | A01K 41/00 119/318 |
| 2,564,508 A | * | 8/1951 | Seacat | A01K 41/00 119/325 |
| 2,612,863 A | | 10/1952 | Wade, Sr. | |
| 2,667,857 A | * | 2/1954 | Smith | A01K 41/00 119/327 |
| 2,734,482 A | | 2/1956 | Seltzer | |
| 2,928,211 A | | 3/1960 | Martin | |
| 3,006,320 A | * | 10/1961 | Bailey | A01K 41/00 119/319 |
| 3,028,208 A | | 4/1962 | Sharpe | |
| 3,147,738 A | * | 9/1964 | Theilig | A01K 41/06 119/322 |
| 3,352,684 A | | 11/1967 | Gard | |
| 3,379,917 A | * | 4/1968 | Menelly | H01J 61/35 313/488 |
| 3,389,688 A | * | 6/1968 | Springer | A01K 41/00 119/311 |
| 3,529,379 A | | 9/1970 | Ware | |
| 3,741,158 A | | 6/1973 | Moe, Jr. et al. | |
| 3,747,568 A | * | 7/1973 | Dugan | A01K 41/06 119/300 |
| 3,797,172 A | | 3/1974 | Cannon | |
| 3,923,006 A | * | 12/1975 | Dugan | A01K 41/00 119/300 |
| 3,938,472 A | * | 2/1976 | Jauneaud | A01K 41/00 119/319 |
| 3,987,331 A | * | 10/1976 | Schreurs | C03C 17/007 313/486 |
| 4,045,911 A | | 9/1977 | Ware | |
| 4,215,651 A | | 8/1980 | Pearce | |
| 4,250,666 A | | 2/1981 | Rakestraw | |
| 4,255,897 A | | 3/1981 | Ruthner | |
| 4,274,364 A | * | 6/1981 | Forseth | A01K 41/04 119/300 |
| 4,378,758 A | | 4/1983 | Coleman | |
| 4,625,728 A | | 12/1986 | Schonberg | |
| 4,640,033 A | | 2/1987 | Bulger | |
| 4,706,608 A | * | 11/1987 | Foster | A01K 41/00 119/319 |
| 4,765,337 A | | 8/1988 | Schonberg | |
| 4,803,949 A | | 2/1989 | Kiyokawa | |
| 5,005,523 A | * | 4/1991 | Foster | A01K 41/00 119/319 |
| 5,013,906 A | | 5/1991 | Miyakawa et al. | |
| 5,090,617 A | | 2/1992 | Swan et al. | |
| 5,173,737 A | | 12/1992 | Mitchell et al. | |
| 5,251,574 A | | 10/1993 | Foster et al. | |
| 5,297,863 A | | 3/1994 | Richardson et al. | |
| 5,575,237 A | | 11/1996 | Ferguson | |
| 5,658,068 A | | 8/1997 | Fritts | |
| 5,814,078 A | | 9/1998 | Zhou et al. | |
| 6,015,713 A | | 1/2000 | Wright, Jr. et al. | |
| 6,152,575 A | | 11/2000 | Montanino | |
| 6,279,263 B1 | | 8/2001 | Lai | |
| 6,312,139 B1 | | 11/2001 | Baker et al. | |
| 6,523,976 B1 | | 2/2003 | Turnbull et al. | |
| 6,584,935 B2 | | 7/2003 | Zohar et al. | |
| 6,680,200 B2 | | 1/2004 | Everett | |
| 6,766,767 B2 | | 7/2004 | El Halawani et al. | |
| 6,789,500 B2 | | 9/2004 | Rozenboim | |
| 6,789,507 B1 | * | 9/2004 | Slate | A01K 41/00 119/302 |
| 6,805,465 B2 | | 10/2004 | Chen | |
| 6,921,182 B2 | | 7/2005 | Anderson, Jr. et al. | |
| 6,953,266 B1 | | 10/2005 | Ver Hage et al. | |
| 6,965,205 B2 | | 11/2005 | Piepgras et al. | |
| 7,032,540 B2 | | 4/2006 | Bonner et al. | |
| 7,131,397 B2 | | 11/2006 | El Halawani et al. | |
| 7,221,104 B2 | | 5/2007 | Lys et al. | |
| 7,287,870 B1 | | 10/2007 | Knoch | |
| 7,441,916 B2 | | 10/2008 | Masuyama et al. | |
| 7,473,008 B2 | | 1/2009 | Crabb et al. | |
| 7,482,764 B2 | | 1/2009 | Morgan et al. | |
| 7,588,340 B2 | | 9/2009 | Bauer et al. | |
| 7,806,543 B2 | | 10/2010 | Swofford et al. | |
| 7,950,817 B2 | | 5/2011 | Zulim et al. | |
| 8,069,819 B2 | | 12/2011 | Huisinga et al. | |
| 8,230,815 B2 | | 7/2012 | Fredricks | |
| 8,272,352 B2 | | 9/2012 | Hendel | |
| 8,277,087 B2 | | 10/2012 | Chien | |
| 8,373,363 B2 | | 2/2013 | Grajcar | |
| 8,468,976 B2 | | 6/2013 | Kakimi et al. | |
| 8,643,308 B2 | | 2/2014 | Grajcar | |
| 8,889,662 B2 | | 11/2014 | Navara | |
| 9,137,874 B2 | | 9/2015 | Maxik et al. | |
| 9,526,215 B2 | | 12/2016 | Suntych | |
| 9,560,837 B1 | | 2/2017 | Suntych | |
| 9,642,314 B1 | | 5/2017 | Joseph | |
| 9,788,495 B2 | | 10/2017 | Martin et al. | |
| 9,844,210 B2 | | 12/2017 | Grajcar et al. | |
| 9,995,446 B2 | | 6/2018 | Powell | |
| 10,098,287 B2 | | 10/2018 | Heidl et al. | |
| 10,201,152 B2 | | 2/2019 | Grajcar et al. | |
| 2001/0027569 A1 | | 10/2001 | Cantrell et al. | |
| 2002/0014444 A1 | | 2/2002 | Hebrank | |
| 2003/0003437 A1 | | 1/2003 | Rozenboi | |
| 2004/0040515 A1 | | 3/2004 | Taniguchi et al. | |
| 2005/0167383 A1 | | 8/2005 | Taccolini et al. | |
| 2006/0072318 A1 | | 4/2006 | Witham et al. | |
| 2007/0245973 A1 | | 10/2007 | Huisinga et al. | |
| 2007/0261128 A1 | | 11/2007 | Cantrell et al. | |
| 2007/0275037 A1 | | 11/2007 | Ding et al. | |
| 2008/0047181 A1 | | 2/2008 | Sakai | |
| 2009/0021956 A1 | | 1/2009 | Grobler et al. | |
| 2009/0199780 A1 | | 8/2009 | Hendel | |
| 2010/0186428 A1 | | 7/2010 | Meter | |
| 2010/0200528 A1 | | 8/2010 | Tourdot et al. | |
| 2010/0306869 A1 | | 12/2010 | Doran et al. | |
| 2011/0000437 A1 | | 1/2011 | Meter | |
| 2011/0094452 A1 | | 4/2011 | Huisinga et al. | |
| 2011/0101883 A1 | | 5/2011 | Grajcar | |
| 2011/0210678 A1 | | 9/2011 | Grajcar | |
| 2011/0228515 A1 | | 9/2011 | Grajcar | |
| 2011/0241559 A1 | | 10/2011 | Grajcar | |
| 2011/0273098 A1 | | 11/2011 | Grajcar | |
| 2011/0280011 A1 | | 11/2011 | Crabb et al. | |
| 2011/0109244 A1 | | 12/2011 | Grajcar | |
| 2012/0042829 A1 | | 2/2012 | Hendel | |
| 2012/0186523 A1 | | 7/2012 | Sia | |
| 2012/0186524 A1 | | 7/2012 | Grajcar | |

(56) References Cited

U.S. PATENT DOCUMENTS

| | | |
|---|---|---|
| 2012/0268918 A1 | 10/2012 | Grajcar |
| 2012/0304322 A1 | 11/2012 | Yamaha et al. |
| 2013/0092094 A1 | 4/2013 | Meter |
| 2013/0104809 A1 | 5/2013 | Meter |
| 2013/0152864 A1 | 6/2013 | Grajcar et al. |
| 2013/0170211 A1 | 7/2013 | Lin |
| 2013/0239475 A1 | 9/2013 | Gustafson et al. |
| 2013/0322072 A1 | 12/2013 | Pu et al. |
| 2014/0126174 A1 | 5/2014 | Grajcar |
| 2014/0158050 A1 | 6/2014 | Grajcar |
| 2014/0159615 A1 | 6/2014 | Grajcar |
| 2014/0165468 A1 | 6/2014 | Roeser et al. |
| 2015/0043203 A1 | 2/2015 | Bengtsson |
| 2015/0122182 A1 | 5/2015 | Aldana et al. |
| 2015/0124426 A1 | 5/2015 | Grajcar |
| 2015/0136030 A1 | 5/2015 | Meissner et al. |
| 2015/0138537 A1 | 5/2015 | Yamamoto et al. |
| 2015/0204497 A1 | 7/2015 | Grajcar |
| 2015/0223402 A1 | 8/2015 | Krijn et al. |
| 2015/0230440 A1 | 8/2015 | Grajcar et al. |
| 2015/0351329 A1 | 12/2015 | Heidl et al. |
| 2016/0021854 A1 | 1/2016 | Grajcar |
| 2016/0120155 A1 | 5/2016 | Grajcar |
| 2016/0132283 A1 | 5/2016 | Hall |
| 2016/0165859 A1 | 6/2016 | Grajcar |
| 2016/0183499 A1 | 6/2016 | Grajcar |
| 2016/0186964 A1 | 6/2016 | May |
| 2016/0356465 A1 | 12/2016 | Polete |
| 2017/0030537 A1 | 2/2017 | Powell |
| 2017/0030560 A1 | 2/2017 | Powell |
| 2017/0071167 A1 | 3/2017 | Grajcar et al. |
| 2017/0071168 A1 | 3/2017 | Grajcar et al. |
| 2017/0074464 A1 | 3/2017 | Grajcar et al. |
| 2019/0150408 A1 | 5/2019 | Grajcar et al. |

FOREIGN PATENT DOCUMENTS

| | | | |
|---|---|---|---|
| GB | 2271497 A | 4/1994 | |
| JP | 2009125012 A | 6/2009 | |
| RU | 20020113424 A | 3/2004 | |
| WO | WO-94013132 A1 | 6/1994 | |
| WO | 2011141559 | 11/2011 | |
| WO | WO-2011/141559 A1 * | 11/2011 | ............ A01K 61/00 |
| WO | WO-2014093445 A1 | 6/2014 | |
| WO | WO-2014126466 A1 | 8/2014 | |
| WO | WO-2015017655 A1 | 2/2015 | |
| WO | WO-2015023178 A1 | 2/2015 | |
| WO | 2015052626 | 4/2015 | |
| WO | WO-2015108443 A1 * | 7/2015 | ............ A01K 41/00 |
| WO | WO-2015164771 A1 | 10/2015 | |
| WO | WO-2016053088 A1 | 4/2016 | |
| WO | 2017048760 | 3/2017 | |
| WO | 2017048763 | 3/2017 | |
| WO | 2017048769 | 3/2017 | |
| WO | 2017048771 | 3/2017 | |
| WO | WO-2018208798 A1 | 11/2018 | |

OTHER PUBLICATIONS

"International Application Serial No. PCT/US2016/051616, Invitation to Pay Add'l Fees and Partial Search Report dated Nov. 21, 2016", 2 pgs.
"U.S. Appl. No. 14/103,798, Non Final Office Action dated Apr. 15, 2015", (dated Apr. 15, 2016), 8 pgs.
"U.S. Appl. No. 14/103,798, Non Final Office Action dated Sep. 9, 2016", (dated Sep. 9, 2016), 26 pgs.
"U.S. Appl. No. 14/103,798, Notice of Allowablity dated Apr. 21, 2016", (dated Apr. 21, 2016), 4 pgs.
"U.S. Appl. No. 14/103,798, Notice of Allowance dated Sep. 30, 2015", (dated Sep. 30, 2015), 5 pgs.
"U.S. Appl. No. 14/877,811, Non Final Office Action dated Feb. 22, 2016", (dated Feb. 22, 2016), 22 pgs.
"U.S. Appl. No. 14/992,935, Non Final Office Action dated Apr. 6, 2016". (dated Apr. 6, 2016), 23 pgs.
"Chinese Application Serial No. 2013800644303, Non Final Office Action dated Oct. 10, 2016", W/ English Translation, (dated Oct. 10, 2016), 8 pgs.
"European Application Serial No. 13862077.8, Extended European Search Report dated Jun. 29, 2016", (dated Jun. 29, 2016), 14 pgs.
"International Application Serial No. PCT/US2013/74308, International Preliminary Report on Patentability dated Jun. 16, 2015", (dated Jun. 16, 2015), 8 pgs.
"International Application Serial No. PCT/US2013/74308, International Search Report dated Feb. 21, 2014", (dated Feb. 21, 2014), 4 pgs.
"International Application Serial No. PCT/US2013/74308, Written Opinion dated Feb. 21, 2014", (dated Feb. 21, 2014), 7 pgs.
"International Application Serial No. PCT/US2015/027560, International Search Report dated Jul. 27, 2015", (dated Jul. 27, 2015), 4 pgs.
"International Application Serial No. PCT/US2015/027560, Written Opinion dated Jul. 27, 2016"(dated Jul. 27, 2016), 7 pgs.
"U.S. Appl. No. 61/570,552, filed Dec. 14, 2011", (Filed: Dec. 14, 2011), 59 pgs.
Archer, G. S, et al., "Effect of providing light during incubation on the health, productivity, and behavior of broiler chickens", Poultry Science, BB(1), (2009), 29-37.
Archer, G. S, "The effects of light stimulation during incubation on indicators of stress susceptibility in broilers", Poultry Science, 92(12), (2013), 3103-3108.
Bednarczyk, M. F, et al., "Influence de l'eclairement de l'embryon de poulet sur le taux d'eclosion, la duree d'incubation et l'hematopoiese", Annales de Recherches Veterinaires (W/ English summary), (1984), 411-416.
Coleman, M. A, et al., "The Effect of Light and Specific Gravity on Embryo weight and Embryonic Mortality", Poultry Science, vol. 54, (1975), 1451-1421.
Cooper, J. B, "Effect of light during incubation on hatchability of turkey eggs", Poult Sci., 51(4), (1972), 1105-1108.
Decuypere, E., et al., "The Endocrine Interface of Environmental and Egg Factors Affecting Chick Quality", Poultry Science, 86(5), (2007), 1037-1042.
Eriwn, W. T, et al., "Response of the Developing Embryo to Light", Poultry Science, 50(6), (1971), 1883-1884.
Fairchild, B. D, et al., "Photostimulation of Turkey Eggs Accelerates Hatching Times Without Affecting Hatchability, Liver or Heart Growth, or Glycogen Content", Poultry Science, 79(11), (2000), 1627-1631.
Ghatpande, A., et al., "Effect of different intensities of fluorescent light on the early development of chick embryos in ovo", Cellular & Molecular Biology Research, 41(6) (Abstract), (1995), 1 pg.
Gold, P. S, et al., "Secondary heating of chicken eggs exposed to light during incubation", Poultry Science, vol. 55, (1976), 34-39.
Gonzalez, A., et al., "Factors Affecting Ostrich Egg Hatchabilily", Poultry Science, 78(9), (1999), 1257-1262.
Hamburger, Viktor, et al., "A series of normal stages in the development of the chick embryo", Developmental Dynamics, 195(4), (1992), 231-272.
Huth, J. C, et al., "Effects of LED lighting during incubation on layer and broiler hatchability, chick quality, stress susceptibility and post-hatch growth", Poultry Science, vol. 94, (2015), 3052-3058.
Isakson, S. T, et al., "Intensities of incandescent light and the development of chick embryos in ovo and in vitro", Comp. Biochem. Physiol, vol. 34, (1970), 299-305.
Kettlewell, J. R, et al., "Temperature-Dependent Expression of Turtle Dmrt1 Prior to Sexual Differentiation", Genesis, vol. 26, (2000), 174-178.
Lauber, J. K, "Photoacceleration of Avian Embryogenesis", Comparative Biochemistry and Physiology part A: Physiology, 51(4), (1975), 903-907.
Masuyama, H., et al., "Dmrt1 mutation causes a male-to-female sex reversal after the sex determination by Dmy in the medaka", Chromosome Research, 20(1), (2012), 163-176.
Moreira De Figueiredo, Andre Filipe, "Control of sexual maturation and growth in Atlantic cod (*Gadus morhua*) by use of cold Cathode

(56) References Cited

OTHER PUBLICATIONS

Light technology", Thesis, Holar University College, Department of Aquaculture and Fish Biology, (2013), 106 pgs.
Narendra, J., et al., "Sex-specific Gene Regulation the Doublesex DM Motif is a Bipartite DNA-Binding Domain", Journal of Biological Chemistry, 277(45), (2002), 43463-43473.
Pandian, T. J, et al., "Androgenesis and conservation of fishes", Journal of Current Science, 85(7), (Oct. 10, 2003), 917-931.
Peebles, D. E, et al., "Effects of Dietary Fat and Eggshell Cuticle Removal on Egg Water Loss and Embryo Growth in Broiler Hatching Eggs", Poulltry Science, 77(10), (1998), 1522-1530.
Raymond, C. S, et al., "Expression of Dmtr1 in the Genital Ridge of Mouse and Chicken Embryos Suggests a Role in Vertebrate Sexual Development", Development Biology, vol. 215, (1999), 208-220.
Rogers, L. J, et al., "Light Exposure During Incubation Affects Competitive Behaviour in Domestic Chicks", Applied Animal Behavior Science, 23(3), (1989), 187-198.
Romanoff, Alexis L, et al., "Biaelectric potentials of the hen's egg", Science, New Series, 90(2342_, (Nov. 17, 1939), 471-472.
Romanoff, Alexis L, et al., "Simulating effects of UV radiation on bioelectric potentials of an avian egg", Journal of Cellular and Comparative Physiology, vol. 20, (1943), 123-127.
Rozenboim, I, et al., "Effect of Embryonic Photostimulation on the Posthatch Growth of Turkey Poults", Poultry Science, 82(7), (2003), 1181-1187.
Seremet, C., et al., "The effects of monochromatic lighting on embryonic development and hatching performance depending on egg shell colour", Avian Biology Research, 5(3) (Abstract), (2012), 182.
Shafey, T. M, et al., "Embryonic Growth, Hatching Time and Hatchability Performance of Meat Breeder Eggs Incubated Under Continuous Green Light", Asian Australasian Journal of Animal Sciences, 15(12), (2002), 1702-1707.
Shutze, J. V, et al., "Influence of incandescent and coloured light on chicken embryos during incubation", Nature, vol. 196, (1962), 594-595.
Siegel, P. B, et al., "Photoacceleration of development in chick embryos", Comp. Biochem. Physiol. vol. 28, (1969), 753-758.
Smith, C. A, et al., "The avian Z-linked gene DMRT1 is required for male sex determination in the chicken", Journal of Nature, 461(7261), (2009), 267-271.
Stavar, P., et al., "The Effect of Red and Blue Light Upon the Embryonary Development and the Ratio Between Sexes", Lucrari stiintifice, vol. 2 (W/English Translation), (1973), 113-126.
Tai, M., et al., "Effect of LED Chromatic Light Sources on Hatching of Broiler Breeder Eggs", Journal of Chinese Society of Animal Science, 37(1) (English Translation), 2008), 1-7.
Tamimie, H S, et al., "Light exposure of incubating eggs and its influence on the growth of chicks—I. Brooding chicks under different light regimes", mp. Biochem. Physiol. vol. 21, (1967), 59-63.
Tamimie, H. S, et al., "Effect of continuous and intermittent light exposure on embryonic development of chicken eggs", Comp. Biochem. and Physiol. vol. 20, (1967), 793-799.
Tzschentke, B, et al., "Imprinting of body functions by manipulation of incubation temperature and its long-lasting effect on hatchability, performance and health in poultry", Avian Biology Research, 5(3) (Abstract), (182), 2012.
Veterany, L., et al., "The Effect of Light on Chicken Hatching", Scientia Agriculturae Bahemica, 33(4), (2002), 150-152.
Veternany, L., et al., "The Influence of Non-Ionic Radiation on the Chicken Hatching", Journal of Environmental Science and Health Part A—Toxic/Hazardous Substances & Environmental Engineering, 37(10), (2002), 1849-1854.
Walter, J. H, et al., "Effect of photoperiod during incubation on embryonic and post embryonic development of broilers", Poultry Science, vol. 51, (1972), 1122-1126.
Walter, J. H, et al., "Effect of photoperiod during incubation on embryonic and post embryonic development of quail and chickens", Br. Poultry Science, vol. 14 (Abstract), (1973), 533-540.
Zhang, L, et al., "Effect of monochromatic light stimuli during embryogenesis on muscular growth, chemical composition, and meat quality of breast muscle in male broilers", Poultry Science, vol. 91, (2012), 1026-1031.
Zhu, L., et al., "Sexual dimorphism in diverse metazoans is regulated by a novel class of intertwined zinc fingers", Genes & Development, 14(14), (2000), 1750-1764.
"International Application Serial No. PCT/US2016/051603, Invitation to Pay Add'l Fees and Partial Search Report dated Dec. 2, 2016", 2 pgs.
"International Application Serial No. PCT/US2016/051613, International Search Report dated Dec. 7, 2016", 2 pgs.
"International Application Serial No. PCT/US2016/051613, Written Opinion dated Dec. 7, 2016", 7 pgs.
Torben, Ross, "The Chicken Egg Incubator", [Online]. Retrieved from the Internet: <http://www.torbenross.com/2015/11/12/the-chicken-egg-incubator/>, (Nov. 14, 2016).
"U.S. Appl. No. 15/265,137, Non Final Office Action With Restriction Requirement dated Oct. 3, 2018", 17 pgs.
"U.S. Appl. No. 15/265,149 Notice of Allowance dated Oct. 12, 2018", 14 pgs.
"U.S. Appl. No. 15/265,149, Notice of Allowability dated Oct. 26, 2018", 2 pgs.
"U.S. Appl. No. 15/265,154, Non Final Office Action with a Restriction Requirement dated Sep. 26, 2018", 23 pgs.
"International Application Serial No. PCT/US2016/051607, International Search Report dated Jan. 27, 2017", 5 pgs.
"International Application Serial No. PCT/US2016/051607, Written Opinion dated Jan. 27, 2017", 8 pgs.
"International Application Serial No. PCT/US2016/051603, International Search Report dated Feb. 9, 2017", 4 pgs.
"International Application Serial No. PCT/US2016/051603, Written Opinion dated Feb. 9, 2017", 7 pgs.
"International Application Serial No. PCT/US2016/051616, International Search Report dated Feb. 17, 2017", 3 pgs.
"International Application Serial No. PCT/US2016/051616, Written Opinion dated Feb. 17, 2017", 6 pgs.
"Hatchbrood", www.hatchtech.nl, 4 pgs.
"U.S. Appl. No. 14/992,935 Final Office Action dated Apr. 11, 2017", 25 pgs.
"U.S. Appl. No. 14/992,935 Non Final Office Action dated Apr. 6, 2017", 23 pgs.
Black, Robert, "Lighting for finches and other caged birds", American Cage Bird Magazine, (2017), 5 pgs.
Evalyne, Githinji, "Smartphone hatches fresh idea for chicken breeder", Business Daily Africa, (Sep. 30, 2013).
Ozkan, S, "PhotoperiodIc Lighting (16 hours of light:8 hours of dark) programs during incubation: 1. Effects on growth and circadian physiological traits of embryos and early stress response of broiler chickens", Poultry Science Association, (Jul. 29, 2012).
U.S. Appl. No. 15/265,137, filed Sep. 14, 2016, Systems and Methods for Promoting Biological Responses in Incubated Eggs.
U.S. Appl. No. 15/265,149, filed Sep. 14, 2016, Systems and Methods for Promoting Biological Responses in Incubated Eggs.
U.S. Appl. No. 15/265,154, filed Sep. 14, 2016, Systems and Methods for Promoting Biological Responses in Incubated Eggs.
"U.S. Appl. No. 14/696,267, Non Final Office Action dated Nov. 2, 2017", 11 pgs.
"U.S. Appl. No. 14/696,267, Non Final Office Action dated May 4, 2017", 30 pgs.
"U.S. Appl. No. 14/877,881, Final Office Action dated Nov. 29, 2016", 18 pgs.
"U.S. Appl. No. 14/877,881, Non Final Office Action dated Nov. 1, 2017", 43 pgs.
"U.S. Appl. No. 14/877,881, Non Final Office Action dated Nov. 1, 2017", 19 pgs.
"U.S. Appl. No. 14/992,935, Non Final Office Action dated Nov. 2, 2017", 19 pgs.

(56) References Cited

OTHER PUBLICATIONS

"Australian Application Serial No. 2013359383, examination report dated Jun. 9, 2017", 6 pgs.

"Chinese Application Serial No. 2013800644303, Second Office Action dated Jul. 5, 2017", w. English Translation, 8 pgs.

"Japanese Application Serial No. 2015545947 Notice of Rejection dated Sep. 5, 2017", w. English Translation, 9 pgs.

Özkan, S, et al., "Photoperiodic lighting (16 hours of light:8 hours of dark) programs during incubation: 2. Effects on early posthatching growth, blood physiology, and production performance in broiler chickens in relation to posthatching lighting programs", Poultry Science Association Inc., (Apr. 23, 2012), 2922-2930.

"U.S. Appl. No. 15/265,137, Final Office Action dated Apr. 23, 2019", 20 pgs.

"U.S. Appl. No. 15/265,137, Response filed Mar. 1, 2019 to Non Final Office Action dated Oct. 3, 2018", 17 pgs.

"U.S. Appl. No. 15/265,154, Final Office Action dated Apr. 24, 2019", 18 pgs.

"U.S. Appl. No. 15/265,154, Response filed Feb. 26, 2019 to Non Final Office Action with Restriction Requirement dated Sep. 26, 2018", 13 pgs.

"International Application Serial No. PCT/US2016/051603, International Preliminary Report on Patentability dated Mar. 29, 2018", 9 pgs.

"International Application Serial No. PCT/US2016/051607, International Preliminary Report on Patentability dated Mar. 29, 2018", 10 pgs.

"International Application Serial No. PCT/US2016/051613, International Preliminary Report on Patentability dated Mar. 29, 2018", 9 pgs.

"International Application Serial No. PCT/US2016/051616, International Preliminary Report on Patentability dated Mar. 29, 2018", 8 pgs.

"International Application Serial No. PCT/US2018/031628, International Search Report dated Jul. 13, 2018", 2 pgs.

"International Application Serial No. PCT/US2018/031628, Written Opinion dated Jul. 13, 2018", 6 pgs.

\* cited by examiner

SYSTEMS AND METHODS FOR PROMOTING BIOLOGICAL RESPONSES IN INCUBATED EGGS

CLAIM OF PRIORITY

This patent application claims benefit of priority of U.S. Provisional Patent Application Ser. No. 62/218,818, entitled "System and Method for Promoting Hatchability", filed on Sep. 15, 2015, U.S. Provisional Patent Application Ser. No. 62/274,929, entitled "Incubating Devices and Methods", filed on Jan. 5, 2016, and U.S. Provisional Patent Application Ser. No. 62/297,322, entitled "Systems and Methods for Promoting Biological Responses in Incubated Eggs", filed on Feb. 19, 2016, the benefit of priority of each of which is claimed hereby, and each of which are incorporated by reference herein in its entirety.

TECHNICAL FIELD

This document pertains generally, but not by way of limitation, to promoting biological responses in incubated eggs including survival of avian from eggs. More specifically, to a lighting system and method for promoting hatchability and sex selection in eggs.

BACKGROUND

Egg production, in avian such as chickens or turkeys has become a commercial industry. In a commercial hatchery, initially eggs are fertilized, either naturally, or through artificial insemination. The eggs often are then refrigerated until ready for incubation. The fertilized eggs are then harvested or conveyed and placed into an incubation chamber or device to promote the hatching of the eggs. In this manner the female avian continues laying additional eggs, or additional eggs are fertilized and environmental conditions can be controlled within the incubating device.

Incubation chambers essentially are entire environmentally controlled rooms sealed to the outside environment where large multi-trayed incubation devices are stored. In an attempt to promote and maximize hatchability environmental conditions such as temperature, humidity and the like are controlled. Typically the temperature within the incubation chamber is controlled to be between 90°-105° F. and typically around 99° F. This is done in many manners known in the art including but not limited to use of a heater in conjunction with a fan to blow warm air evenly throughout an incubation chamber. The humidity is controlled to keep the relative humidity at least above 45%.

Controlling the heat within the incubation chambers can be managed by periodically during the incubation process rearranging trays within an incubating device to ensure even heating for all eggs within the system. In addition, heat within the room is even monitored to address the amount of heat produced by the embryos themselves as they develop.

Within some incubation chambers fan elements are provided along with temperature control units such as temperature regulating coils are utilized to heat and cool the environment. The temperature regulating coils present a conduit forming a plurality of parallel spaced apart radiating members having fluid flowing therethrough within the incubation chamber. The fan element is often a commercial fan having a plurality of blade elements of comparable height as an incubating device or multiple fan elements is/are positioned adjacent the temperature control units to convey the cooling air throughout the interior of the chamber.

Another feature of incubation chambers in the art is that they are designed to fit as many eggs as possible into each chamber with limited room for unused space. The incubation chambers are lined up in side by side relation with sealed doors closing each chamber. The incubating devices themselves are rolled into each chamber. Often a rail element is utilized at the side the chamber to help guide the incubation devices within the chamber and keep the incubation devices centered in the chamber to facilitate removal and to prevent the incubating devices from hitting auxiliary units within the incubation chamber such as the fan element or the temperature control unit.

In some incubation chambers the fan element and temperature control unit are located between two adjoined chambers in between the doors so that the fan and temperature control unit, control the airflow and heat within the two adjoined chambers. While the rail element prevents the incubating devices from running into these auxiliary devices within the chamber, very little room remains between the rail element and auxiliary devices.

In addition, cleanliness is extremely important in the incubation chamber. Upon removal of the incubation devices cleaning agents and high pressure water are utilized to clean all surfaces within the chamber.

Regarding the incubation devices themselves, there are multiple types of incubation devices. A first type is referred to as a setter that presents a frame with a plurality of trays that hold the eggs. The trays have openings therein of size and shape to receive an egg and there is no place for chicks from hatched eggs to be held. Setters are used only for incubating purposes and hold as many eggs as possible and present rotating trays where often a rotation frame that fits within the frame of the incubation device is utilized. The second type of incubation device is referred to as a hatcher. A hatcher also has trays with openings to receive eggs, but either the tray itself is a basket element that both holds the eggs and chicks when they hatch or alternatively a separate basket element is provided underneath the trays so as the eggs hatch they drop into the basket elements to hold the hatched chicks. The basket elements are perforated to allow continued air flow through the device.

Typically, eggs are first placed in a setter during a first incubation period of incubation and then transferred into a hatcher during a second incubation period or hatching period of incubation. The predetermined period of the first incubation period is dependent on egg type and for certain eggs, for example only, this is 15 days, for others 18. Similarly, the second incubation period is also dependent on egg type and typically is at least 48 hours or more. Alternatively, once the first incubation period within the incubation chamber is reached, the environmental conditions of the incubation chamber are altered during the second incubation period and eggs are not transferred and instead the incubation device has basket elements to hold the hatched chicks, Because of the size and shape of the basket elements more eggs can be placed into the setters making use of separate setters and hatchers advantageous. While setters and hatchers have been described, other incubating devices are contemplated by the disclosure.

In addition, the incubation devices are designed to further promote hatchability. In particular, the incubating device has a plurality of rotating trays that rotate the eggs periodically to +/−15°-30° of center (0°). The conditions on the eggs, including but not limited to the temperature, humidity and movement are controlled specifically to mimic conditions presented in nature and tested to determine the optimum conditions to promote hatching within the eggs.

The incubation device is also designed to maximize worker efficiencies. In particular, the incubation devices are open on at least one side and are designed so that the trays or alternatively the egg holders on the trays or basket elements can be slidably inserted and removed from the incubation device. In this manner eggs and/or chicks are quickly and efficiently inserted and removed from the incubation devices.

Typically light for the eggs is not used in such an environment, either in the incubation chamber or on the incubation device and eggs are incubated in darkness. Based on previous research the use of light in hatcheries has largely been discouraged. While the use of light has been seen as advantageous in certain instances, improper use of light has been shown to provide potentially negative results within a commercial hatchery.

In U.S. Pat. No. 4,378,758 to Coleman, Coleman teaches introducing different colored lighting into an incubation device and Coleman examined the effect of the light on hatchability, hatch time and chick weight. Coleman was careful to warn that the exposure of the colored light on the egg needed to substantially take place over the period of buoyancy (first 9 days of incubation) and only directed through the air cell adjacent the broadened end of the egg to avoid deleterious effects otherwise occasioned because of internal heating of the egg. Thus Coleman utilized a fiber optic cable to concentrate light at this point. Coleman concluded that the period of illumination treatment should extend to about the third day to improve hatchability and to decrease hatching time lighting should occur during days 1-9 of incubation. Treatment during days 9-17 were seen as a manner in which to improve chick weight. Still, Coleman's fiber optic system is difficult to implement and full exposure of light on the egg was discouraged by Coleman causing complex design issues in a commercial setting.

Rozenboim, in U.S. Pat. No. 6,789,500, studied the use of monochromatic green light on eggs in an incubating device and determined the light simply had no effect on fertility or hatchability during trials compared to darkness. As indicated in the '500 patent this was consistent with incandescent white light that showed no effect on hatchability on turkey eggs. Consequently, lighting typically is not used in the hatching process because lighting devices tend to produce significant amounts of heat that must be accounted for in the controlled hatching environment and in order to protect the incubated eggs, complex lighting systems where needed. Thus eggs are incubated in darkness throughout the industry.

SUMMARY

A principle object of this document is to provide an incubating device that promotes biological responses within eggs in a commercial incubation chamber. Another object of this document is to provide a light supporting device within an incubation chamber that prevents inefficiencies in the commercial setting. These and other objects, features, advantages and improvements will become apparent from the specification and claims.

Presented are incubation systems and methods that utilize lighting devices to promote biological responses within the incubated eggs, including increased hatchability and sex selection. The systems include light supporting devices that are installed into new or preexisting incubation chambers by either securing the light supporting devices to an incubation device or securing the light supporting device within the incubation chamber spaced apart from the incubation device.

According to one example the light supporting device is removably secured to the body of an incubating device to allow the light supporting device to be removed when insertion of eggs or removal of eggs is desired by a user. Directional lighting elements and support member location utilized to ensure as much surface area of the eggs in the interior cavity of the incubation device is irradiated by the light devices of the light supporting device.

In another example utilizes a control system to promote biological responses within the incubated eggs by providing light of pre-determined wavelengths and for pre-determined periods of light and dark. The control system dims and actuates the lighting devices to provide the desired color and photoperiod for the egg type being incubated to promote the biological responses within the incubated eggs.

In yet another example a narrow band of wavelengths is provided to the lighting devices of the light supporting device in spaced relation from the incubation device. Through use of directional lighting and placement within the incubation chamber light penetrates the interior cavity of the incubating device to promote biological responses within the incubated eggs. Light is provided at pre-determined wavelengths, including to account for egg type and shell penetration depths to promote the biological responses.

An additional example includes the use of a light supporting device that lies in a single plane. Circuitry is utilized on that same substrate as the lighting elements to reduce the size of the lighting devices eliminate heat. By providing a light supporting device that lies in a single plane the light supporting device is able to be installed into pre-existing incubation chambers adjacent incubation devices despite a lack of space with such incubation chambers. Further, the lighting devices provide both a spectral output within 15 nm of 640 nm and within 15 nm of 450 nm to promote biological responses in incubated eggs.

In another aspect the present techniques include providing methods for installing a light supporting devices within an incubation chamber. This includes light supporting devices that have adjustable foot members that compression fit the light supporting devices between the ceiling and floor of the incubation chamber along with light supporting devices that secure to auxiliary devices within the incubation chamber and convey heat to these auxiliary devices.

According to another example, a method for installing a light supporting device includes providing an auxiliary environmental device within the chamber, and attaching the light supporting device to the auxiliary environmental device in spaced relation to an interior of a body of an incubation device within the chamber.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Applicant determined that one can utilize light on incubated eggs to promote a biological response within the eggs. In particular, certain narrow bands of wavelengths and/or combinations of narrow bands can significantly improve hatchability of avian eggs when illuminating the entire egg during incubation. As described in US. Pub. No. 2014/0158050 to Grajcar, which is incorporated in full herein, narrow wavelength bands were shown to significantly improve hatchability of avian eggs. In addition, as disclosed in the '050 publication, energy from different wavelengths of light can also be used to promote other biological responses within the eggs including selecting the sex of a hatched chick. In particular, the '050 publication showed that light could be used within an incubation device to influence the sex of the hatched chick.

However, additional problems remain. While improving hatchability and selecting sex in a lab setting is possible, adopting technologies to a commercial setting is problematic. In commercial hatcheries speed in important and trays holding eggs must be removable to allow quick insertion and removal of eggs within the incubating device. In addition, lighting devices produce heat that again can affect eggs within the incubation device and alter the environment in an incubation device. Additionally, electricity remains expensive, even when energy efficient lighting is utilized, adding costs to egg production. Further, current commercial hatcheries are not built to accommodate lighting therein. In fact, current hatcheries are built to fit as many eggs into an incubation space as possible leaving little room for additional components of any kind. Thus a need in the art exists to promote biological responses within eggs of an incubation chamber and operate to avoid slowing or hurting overall production.

Figure 1:
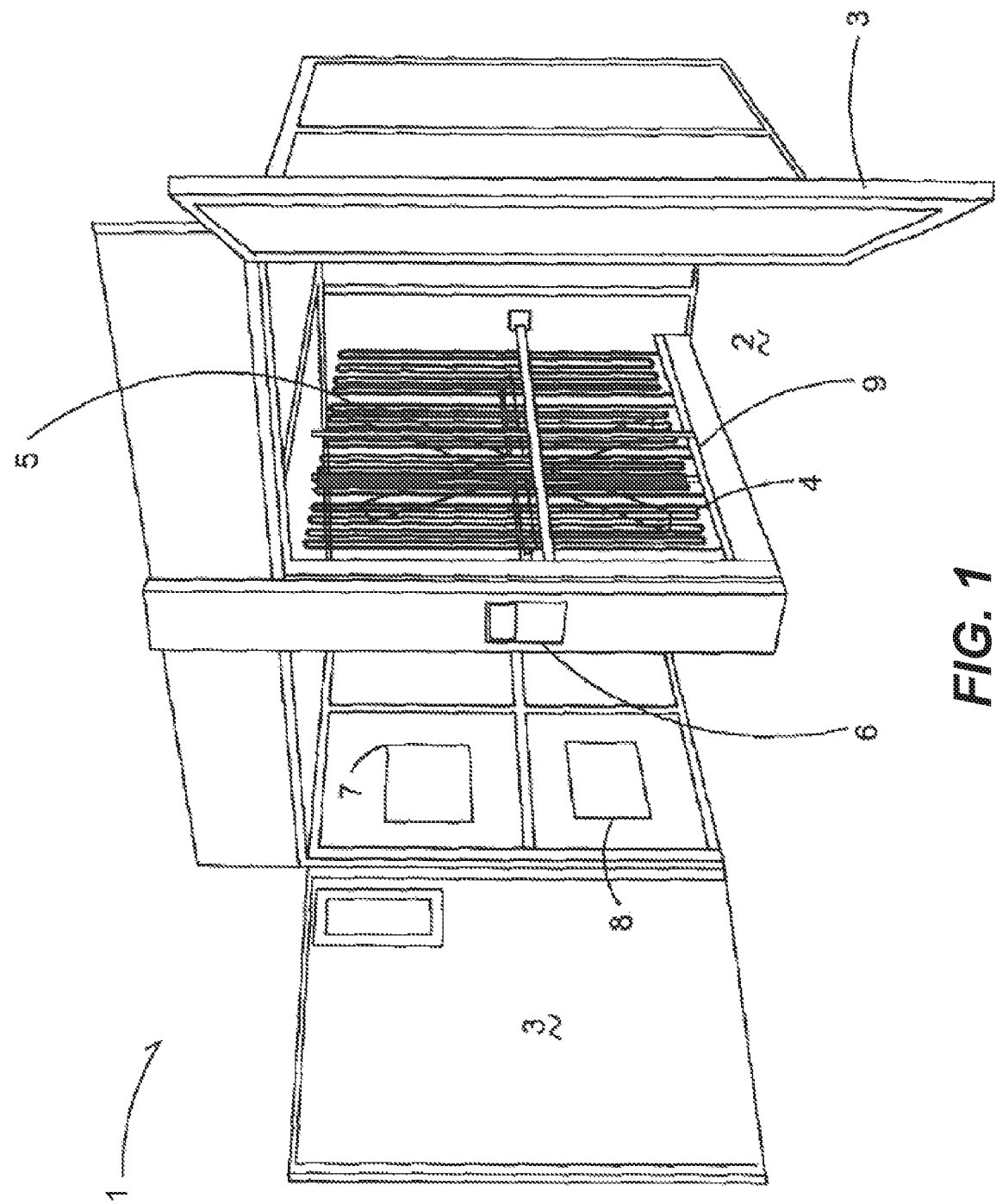
FIG. 1 is a perspective view of an incubation chamber.

FIG. 1 shows an incubation chamber 1 generally having an open interior 2 closed and sealed by a door member 3. When closed the door member 3 forms an airtight seal to keep the internal environmental conditions within the interior 2 controlled.

At least one temperature control member 4 is within the incubation chamber 1 that in one embodiment is a radiating coil having fluid conveyed therethrough to provide heat or cool air to keep the interior 2 at a predetermined temperature. In one embodiment a fan element 5 is spaced apart from the temperature control member 4 to convey air through the incubation chamber to ensure even temperature distribution throughout the incubation chamber 1. The fan element 5 extends the height of the incubation chamber 1 to circulate air accordingly. In one embodiment an incubation chamber has two door members that seal to the outside and the fan element 5 is positioned between the door elements to be centrally located within the incubation chamber 1 and again convey air and thus provide temperature control throughout the incubation chamber 1.

A control unit 6 is electrically, or digitally through over the air communication, connected to the fan element 5, temperature control member 4, and sensor elements 7 and 8 that monitor the environmental conditions within the incubation chamber 1. In one embodiment the sensor elements 7 and 8 are a humidity sensor and temperature sensor, respectively. In one example, the control unit 6 is located on the exterior of the incubation chamber 1 to provide read outs of the environmental conditions with the incubation chamber 1 for a user. The control unit 6 operably actuates the temperature control member 4 and fan element 5 to keep both the humidity and temperature at constants throughout a predetermined incubation period.

Rail elements 9 are disposed within and extend in the interior 2 of the incubation chamber 1 generally in front of the temperature control member 4 and fan element 5. In particular, the rail elements 9 are presented to protect the temperature control member 4 and fan element 5, and are spaced apart therefrom such that when incubating devices 10 are put into the incubation chamber 1, typically rolled in, the incubation devices 10 engage the rail element 9 instead of the temperature control member 4 or fan element 5. The rail elements 9 also assist in guiding and centering the incubation devices 10 into the interior 2 so that a maximum number of incubation devices 10 can be placed within the interior 2 of the incubation chamber 1.

Figure 2A:
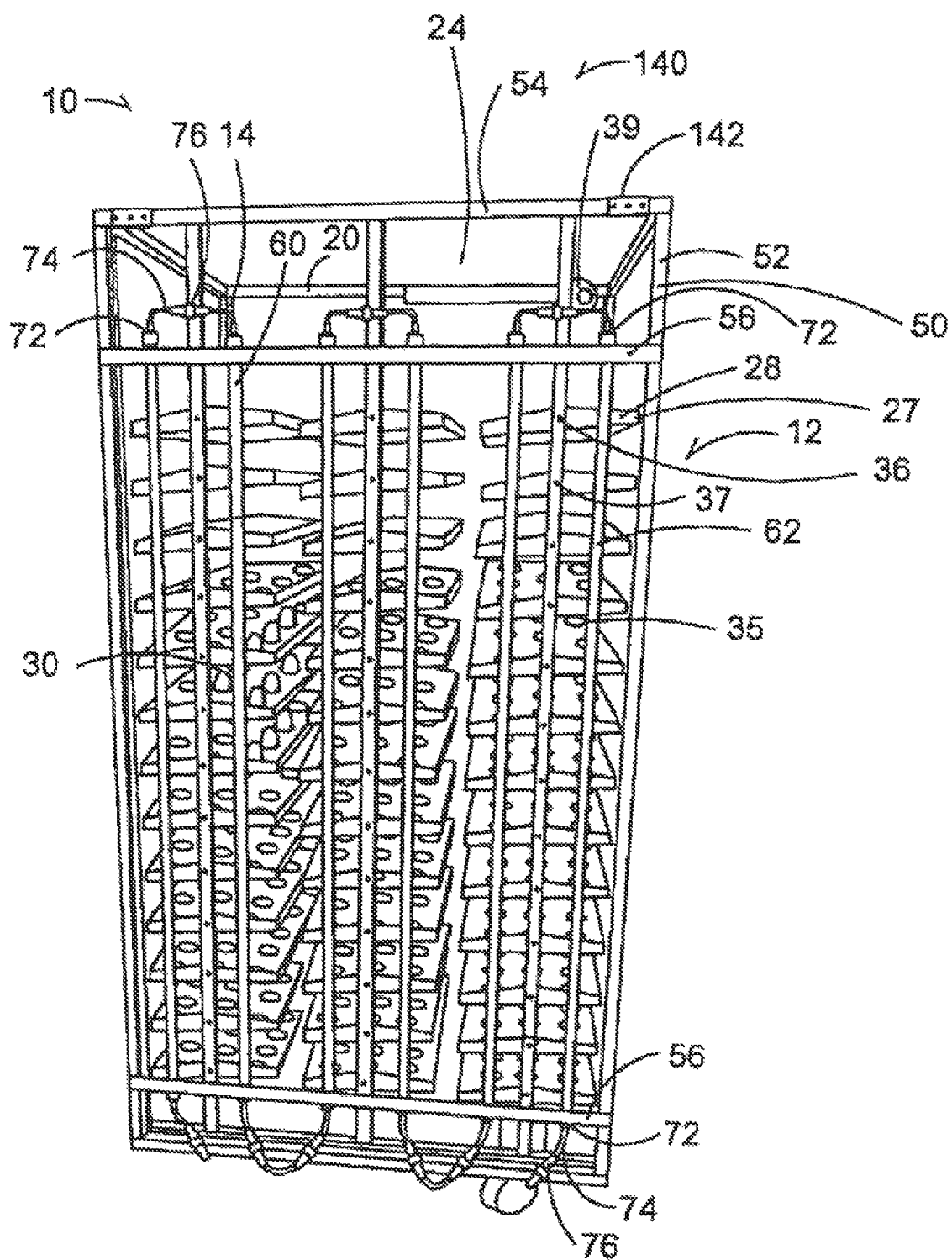
FIG. 2A is a perspective view of a setter incubation device with a light supporting device secured thereto.
Figure 2B:
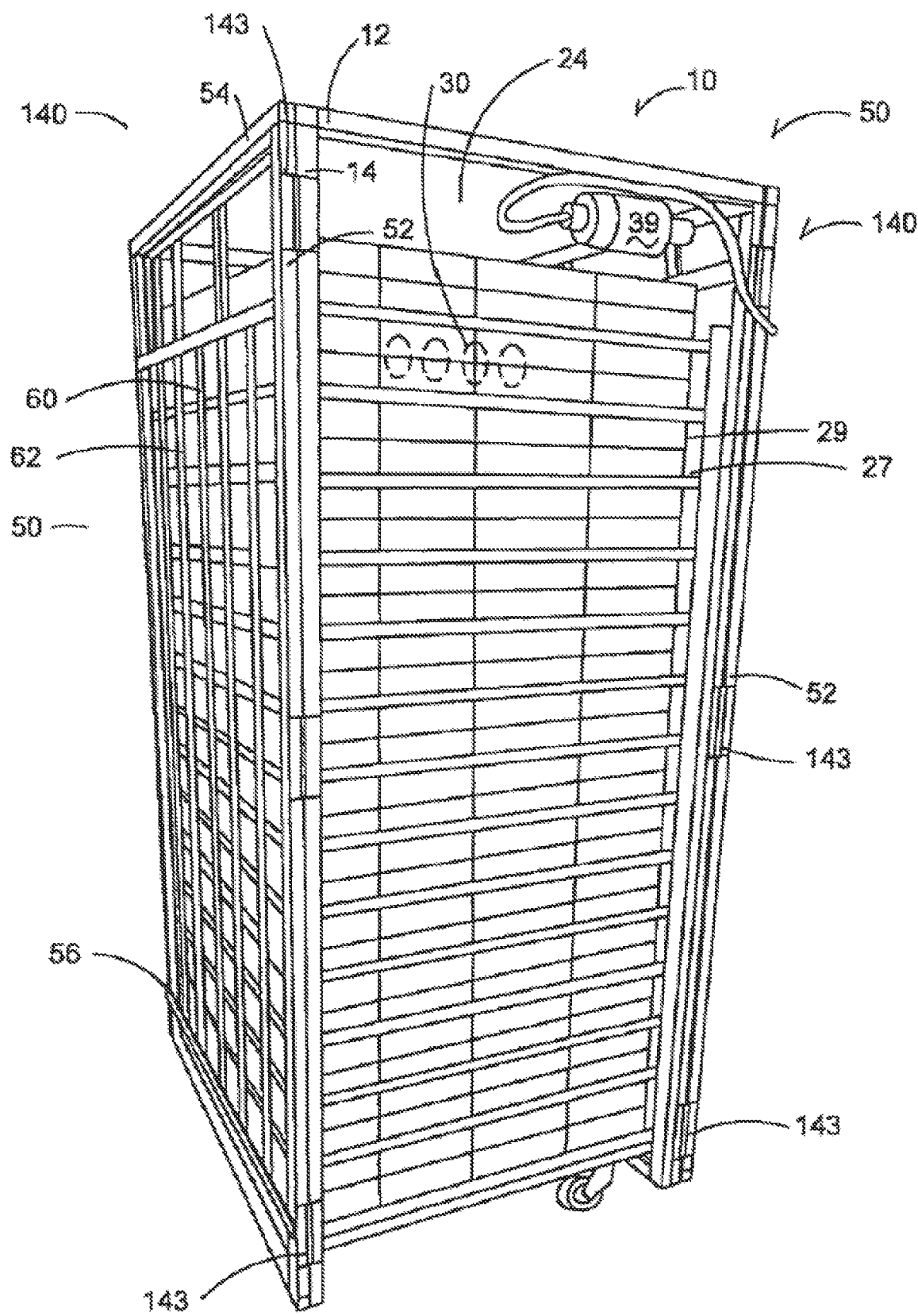
FIG. 2B is a perspective view of a hatcher incubation device with a light supporting device secured thereto.

The incubating device 10 is of any type, including but not limited to setters or setting devices (e.g., FIGS. 2A, 2C), hatchers or hatching devices e.g., FIG. 2B) and the like. In the illustrative embodiments the incubating devices 10 have a body 12 that is a frame that has a generally rectangular cuboid shape having vertical support members 14 in parallel to each other. The vertical support members 14 are connected to and orthogonal to horizontal support members (20, 54) that are themselves in parallel to each other. While the body or frame 12 is open, the frame has a hollow interior cavity 24.

A plurality of holding members 27 such as trays 28 or basket elements 29 are disposed within the interior cavity 24 to hold a plurality of eggs 30 within a plurality of stabilizing members 35 such as but not limited to slots, holes, openings, cups or the like that are configured to hold and prevent movement of an egg 30. In one embodiment the holding member 27 is made of a transparent material to allow light to pass through the holding member 27 to permit complete irradiation of the eggs 30. In some embodiments both a tray 28 and basket element 29 are utilized with the basket element 29 underneath the tray 28 to receive hatched chicks. In another embodiment the basket elements 29 themselves both hold the eggs 30 and provide an area for the hatched chicks. The holding members 27 in one embodiment are slidably within the body 12 such that each holding member 27 can be pulled out of the interior so that the eggs 30 can be retrieved. The eggs 30 can be of any avian species, including, but not limited to chicken eggs, turkey eggs, and the like. Reptilian and other species' eggs may also be used.

In some embodiments a tilting system 36 is provided that receives the holding members 27 to cause the holding members 27 to rotate or tilt to various angles in response to simulate the movement the egg 30 would encounter in nature, for example, as the egg is laid upon by a hen or subject to other environmental conditions. In one example, each holding member 28 is mounted on a rotatable axle 37 mounted to and controlled by a rotational actuator 39. The actuator 39 is itself mounted to the body 12, and is operative to move the holding members 27 with respect to the body 12 as is known in the art. The actuator may continuously or periodically move the holding members 27 having the eggs 30 disposed thereon. In the one example, the actuator 39 is operative to rotate the holding member 27 between a horizontal position (as shown) and angled positions in the clockwise and counter-clockwise directions. The angled positions may correspond to angles measured from the horizontal, and may range between 0° and a maximum angle (e.g., 15° or 30°). The maximum angle is generally selected such that even when the holding member 27 is rotated to the maximum angle, any eggs 30 disposed on or in holding member 27 are not dislodged from the stabilizing member 35.

FIGS. 2A-2C, 3A-3C and 4A-4B show the light supporting device 50 having vertical support members 52 aligning with the vertical support members 14 of the body 12 and horizontal support members 54 aligning with the horizontal support members 20 of the body 12. The light supporting device 50 has auxiliary horizontal support members 56 extending between the vertical support members 14. The auxiliary horizontal support members 56 align with an edge of a holding member 27. In one embodiment the support members of the light supporting device 50 are of one-piece construction. While described and shown in the Figures as a solid frame with support members, light supporting device is any device, including a hung wire or the like that supports a plurality of lighting devices 60 in a manner that allows light from the lighting devices 60 to irradiate the eggs 30 within the cavity 24.

In each embodiment a plurality of lighting devices 60 are secured to the light supporting device 50 and attached to the auxiliary horizontal support members 56. The lighting devices 60 are spaced apart evenly across the light supporting device 50, in one embodiment in a grid like manner, such that a generally evenly spread out intensity of light is provided on the eggs 30. In particular, the lighting devices are spaced such that when the support device is secured in place the lighting devices are laterally spaced from the vertical support members 14 of the body 12. This provides for maximum coverage of eggs 30 within the holding members 27. In addition, the light supporting device 50 in general is in a single plane and is of size and shape to fit within the space formed between the rail element 9 and either the temperature control member 4 or fan element 5 to minimize the space taken up by the light supporting device 50 within the interior and allow the light supporting device 50 to fit within the incubating device 10.

Figure 5A:
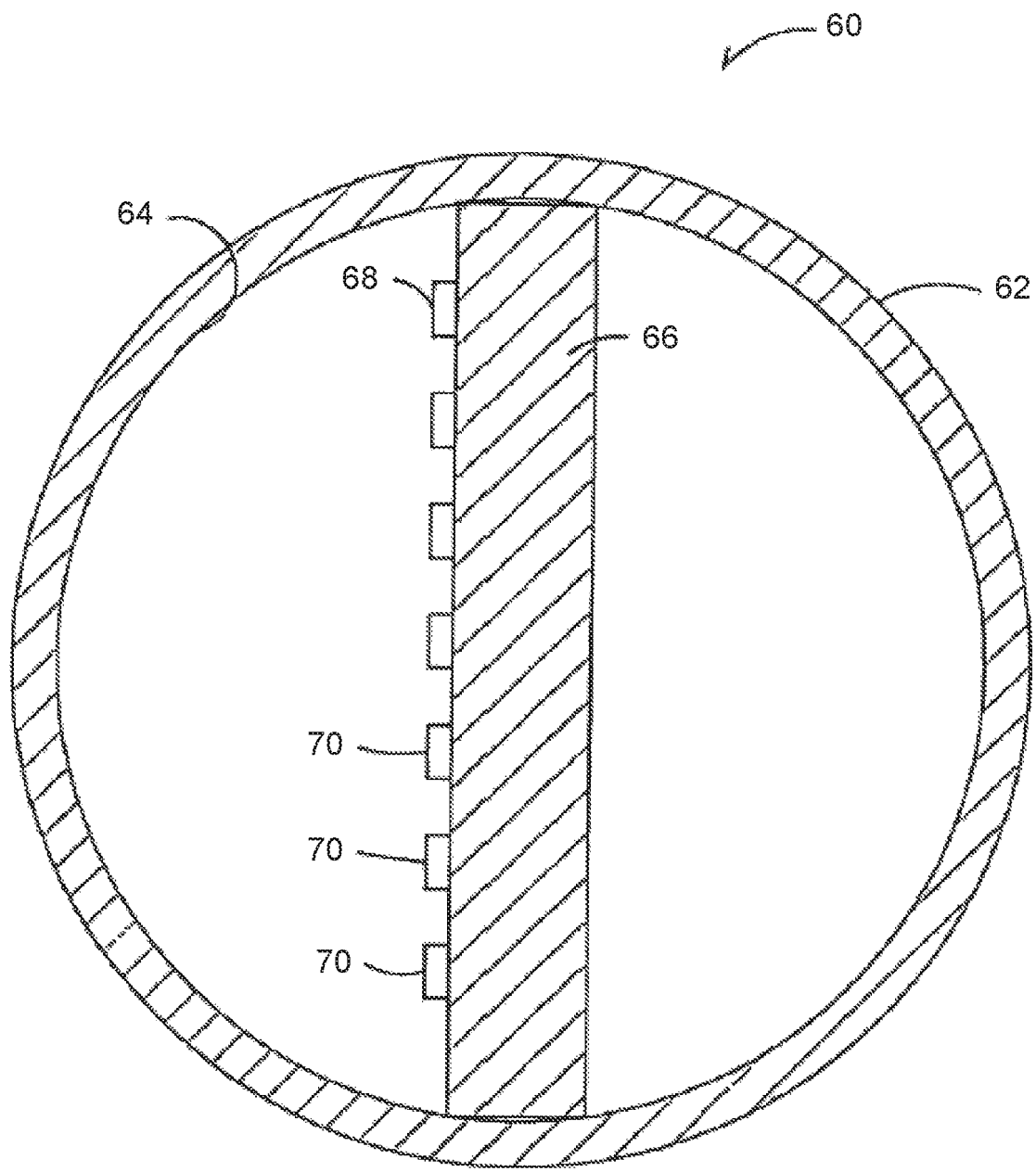
FIG. 5A is a sectional view of a lighting device.

The lighting devices 60 can be of any type, including but not limited to incandescent lights, compact fluorescent lights, high pressure solid lights, LED lights or the like. Similarly, the lighting devices can be strip lights on a single plane, individual LEDs, tube lights or the like. In one embodiment as provided in FIG. 5A the lighting devices 60 are tube lights having an elongated tubular body 62. The elongated tubular body 62 in one embodiment utilizes reflective material on half of its surface to reflect light in a single direction. The elongated tubular body 62 also has a hollow interior 64 that receives a substrate 66 that in one embodiment is a printed circuit board having circuitry or driving components 68 thereon to operate lighting elements 70 that in one embodiment are a plurality of light emitting diodes (LEDs) secured to the substrate 66. The substrate 66 engages the interior of the elongated tubular body 62 such that heat from the circuitry or driving components 68 and lighting elements 70 (LEDs) is conveyed from the substrate 66 to the elongated tubular body. Any additional heat sink engaging the substrate can be utilized without falling outside the scope of the present devices or techniques.

The lighting elements 70 are directional and when used in combination with the reflective material of the elongated tubular body 62 to increase light within the interior cavity 24, the maximum amount of light is directed toward the interior cavity 24 of the device 10. As a result of the directional nature of the lighting elements 70 the light supporting device 50 is designed so that when positioned in its place to emit light on the eggs 30 the lighting elements are angled to direct light that is away from or does not emit light on the vertical support members 14 of the body to provide an even spread of light on the eggs 30 without losing light due to reflection or blocking by the body 12. Further, the lighting elements 70 of the lighting devices 60 are positioned direct light at an angle that accounts for the rotation of the holding members 27 to ensure the amount of light on the surface area increases as rotation occurs in a first direction. In addition, more than one light supporting device 50 can be utilized and attached to a different side of the incubation device 10 to increase the light within the cavity 24. Thus, as a result of the directional nature of the lighting elements 70, the positioning of the light supporting device 50 or use of multiple light supporting devices 60, all exposed surfaces of the plurality of eggs are irradiated. Thus efficiencies are increased.

End caps 72 are secured to the ends of the elongated tubular body 62 and are of type to seal the hollow interior 64 while providing access to wiring 74 to provide electrical power to the lighting devices 60 and to permit the lighting devices 60 to be electrically connected via a plurality of electrical connectors 76. The end caps 72 in one embodiment provide a water proof seal such that when a wash down of the body occurs the ingress of water within the lighting device 60 is prevented, and water does not penetrate within the tubular body 62.

Figure 5B:
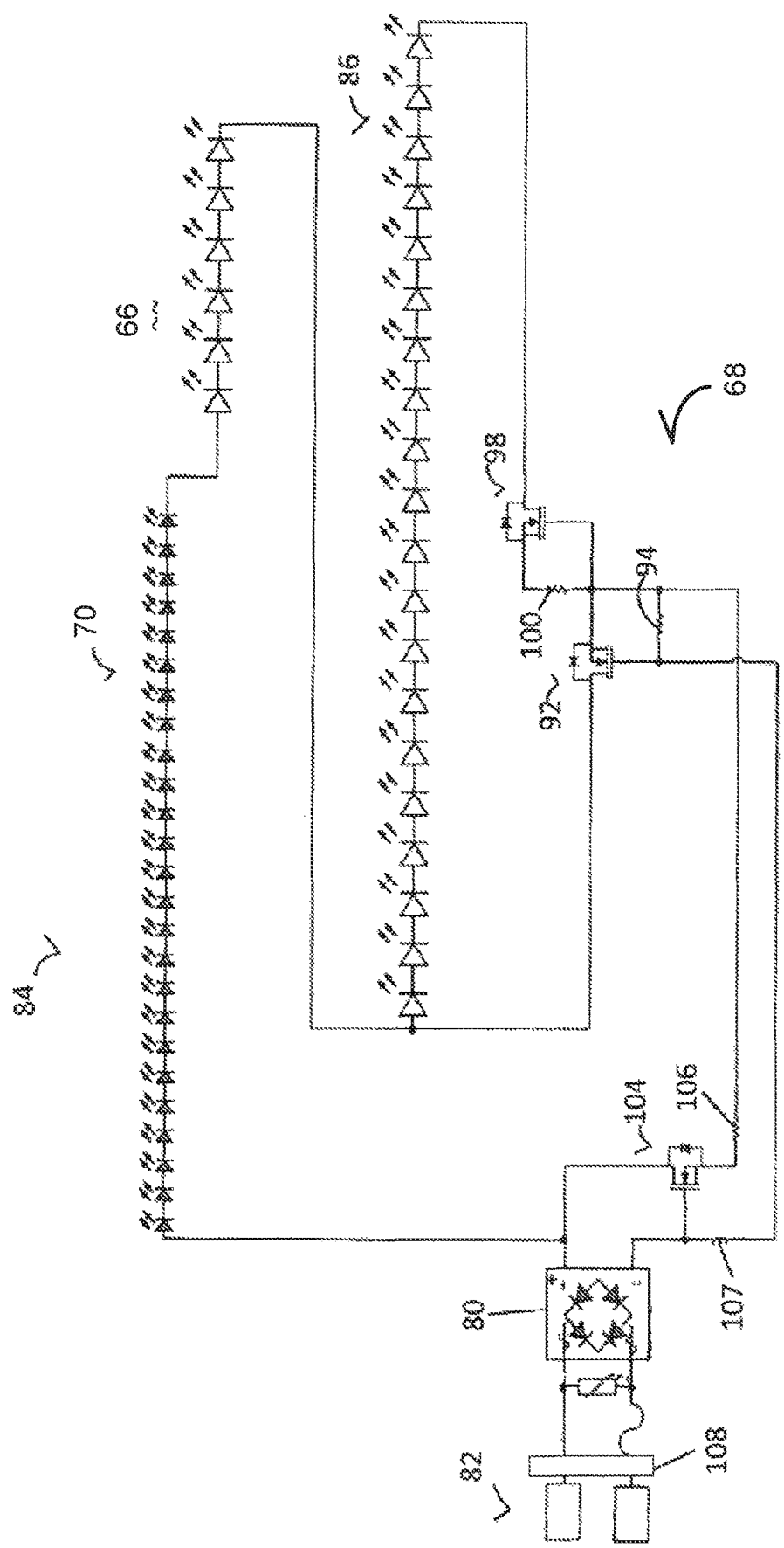
FIG. 5B is a schematic diagram of circuitry for a lighting device.

FIG. 5B shows the substrate 66 having circuitry or driving components 68. The circuitry is similar to that taught in U.S. Pat. No. 8,373,363 entitled, "Reduction of Harmonic Distortion for LED Loads", by Z. Grajcar, issued on Feb. 12, 2013, and U.S. Pat. No. 8,643,308, entitled, "Spectral Shift Control for Dimmable AC LED Lighting," by Z. Grajcar, issued on Feb. 4, 2014, the entire contents of each of which are incorporated herein by reference.

The circuitry or driving components 68 includes a rectifying device 80 that receives current from an AC source 82 and includes a first group of light emitting diodes 84 arranged in series with a second group of light emitting diodes 86. In one embodiment the first group of light emitting diodes 84 comprise LEDs that emit a single narrow band wavelength. This narrow band of wavelengths includes wavelengths that are visible to humans and ultraviolet and infrared wavelengths not visible to humans, including but not limited to narrow bands of wavelength in any range from 300 nanometers (nm) to 800 nm. In one embodiment light having a wavelength between 430 nm and 470 nm is emitted. Alternatively, the first group of LEDs 84 emit light having a wavelength between 620 nm-660 nm. Alternatively, the first group of LEDs 84 comprises a mix of LEDs with some emitting light having a wavelength between 430 nm and 470 nm and others emitting light having a wavelength between 620 nm-660 nm.

In another embodiment the first group of LEDs 84 emit light at a wavelength that increases the shell penetration of the light into the egg over other wavelengths based on the type and color of egg being incubated. Specifically, certain wavelengths of light, such as 620 nm-660 nm light has been shown to emit or penetrate through certain egg shells, including but not limited to brown turkey egg shells at a greater rate than other wavelengths of light, providing light energy directly to the embryo at a greater rate than other wavelengths. Alternatively, the first group of LEDs emit white light or a combination of narrow bands of wavelengths and white light.

The second group of light emitting diodes 86 comprise LEDs that emit a single narrow band wavelength. This narrow band of wavelengths includes wavelengths that are visible to humans and ultraviolet and infrared wavelengths not visible to humans, including but not limited narrow bands of wavelength in any range from 300 nm to 800 nm. In an embodiment the second group of light emitting diodes 86 emit white light. Alternatively, in an embodiment light having a wavelength between 430 nm and 470 nm is emitted. Alternatively, the second group of LEDs 86 emit light having a wavelength between 620 nm-660 nm. Alternatively, the second group of LEDs 86 comprises a mix of LEDs with some emitting light having a wavelength between 430 nm and 470 nm and other LEDs emitting light having a wavelength between 620 nm-660 nm.

In another embodiment the second group of LEDs 86 emit light at a wavelength that increases the shell penetration of the light into the egg over other wavelengths based on the type and color of egg being incubated. Specifically, certain wavelengths of light, such as 620 nm-660 nm light has been shown to emit or penetrate through certain egg shells, including but not limited to brown turkey egg shells at a greater rate than other wavelengths of light, providing light energy directly to the embryo at a greater rate than other wavelengths. Alternatively, the first group of LEDs emit white light or a combination of narrow bands of wavelengths and white light.

A bypass path is presented with a first impedance element 92 that in an embodiment is a transistor. In an example embodiment, the first impedance element 92 is a depletion MOSFET, though a p-channel MOSFET, n-channel MOSFET or the like can be used without falling outside the scope of this disclosure, even if an additional transistor is required for functionality purposes. A first resistor 94 is also provided to control the flow of current through the first impedance element 92 to provide smooth and continuous current flow.

Connected in series to the second group of light emitting diodes 86 is a second impedance element 98 that similarly in an embodiment is a depletion MOSFET. Similar to the first impedance element 92, the second impedance element 98 utilizes a second resistor 100 again to control the impedance element 98. Similarly, also, a third impedance element 104 and third and fourth resistors 106 and 107 are provided. In this manner when a dimming device 108 is electrically connected to the circuit and the color output of the combined first and second LED groups 84 and 86 are controlled as a function of electrical excitation. The dimming device in one embodiment is placed on the exterior the incubation chamber 1 to prevent heat from electrical circuitry within the dimming device 108 from being conveyed into the interior 2 of the chamber.

By utilizing the circuitry 68 provided in FIG. 5B a minimal amount of electrical components, such as transistors, resistors and the like are utilized. In particular, excluding the LED groups 84 and 86, the circuit presents less than ten electrical components, and in the embodiment of FIG. 5B excluding the dimmer has eight electrical components. Because the circuitry 68 has so few driving components for the LED groups 84 and 86, heat from these components is minimized. This is advantageous in multiple respects. First, this causes the lighting devices 60 to have minimal effect on the temperature within the incubation chamber 1. Additionally, the circuitry all lies on a single plane, minimizing overall space, but also allowing heat from the substrate 66 to be conveyed directly to a heat sink and conveyed to desired locations within the incubator. In this manner if more heat is needed for certain individual holding members 27, the heat is conveyed to provide the desired even heating throughout the incubation chamber 1. In addition, because heat from the circuitry is minimized the LED groups 84 and 86 are able to be in close proximity to the eggs 30 without causing damage to the eggs 30. Thus, light at predetermined wavelengths can irradiate all exposed surfaces of the eggs 30 and after the period of buoyancy of embryos in the eggs 30 without deleterious effects on the embryos. In addition, by actuating the dimming device 180 and varying the intensity of the LEDs 84 and 86, the circuitry can be utilized to increase or decrease thermal load within the chamber 1.

Figure 6A:
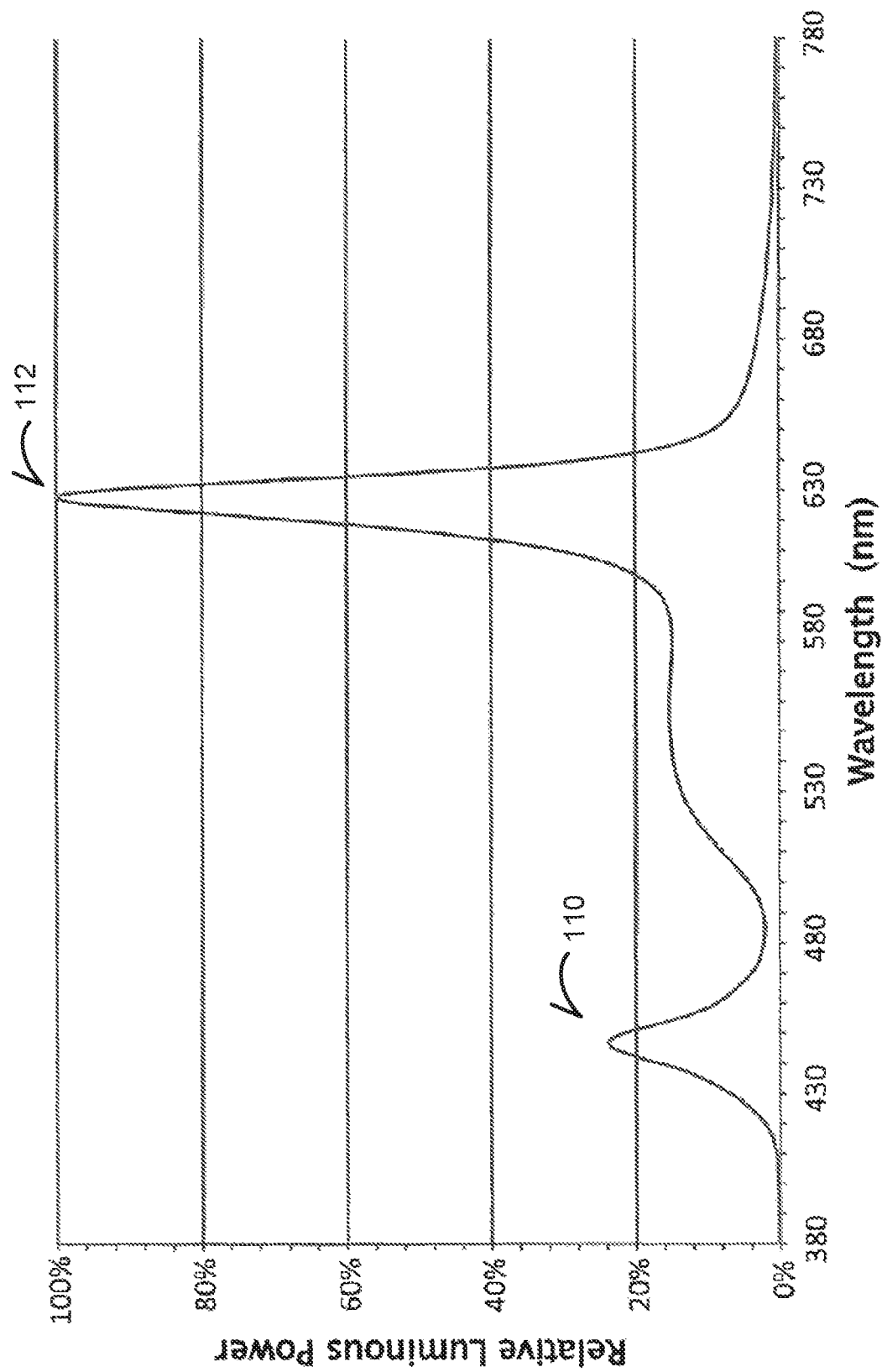
FIG. 6A is a graph showing the relative luminous power for wavelengths when a lighting device has a spectral output at 100% intensity.
Figure 6B:
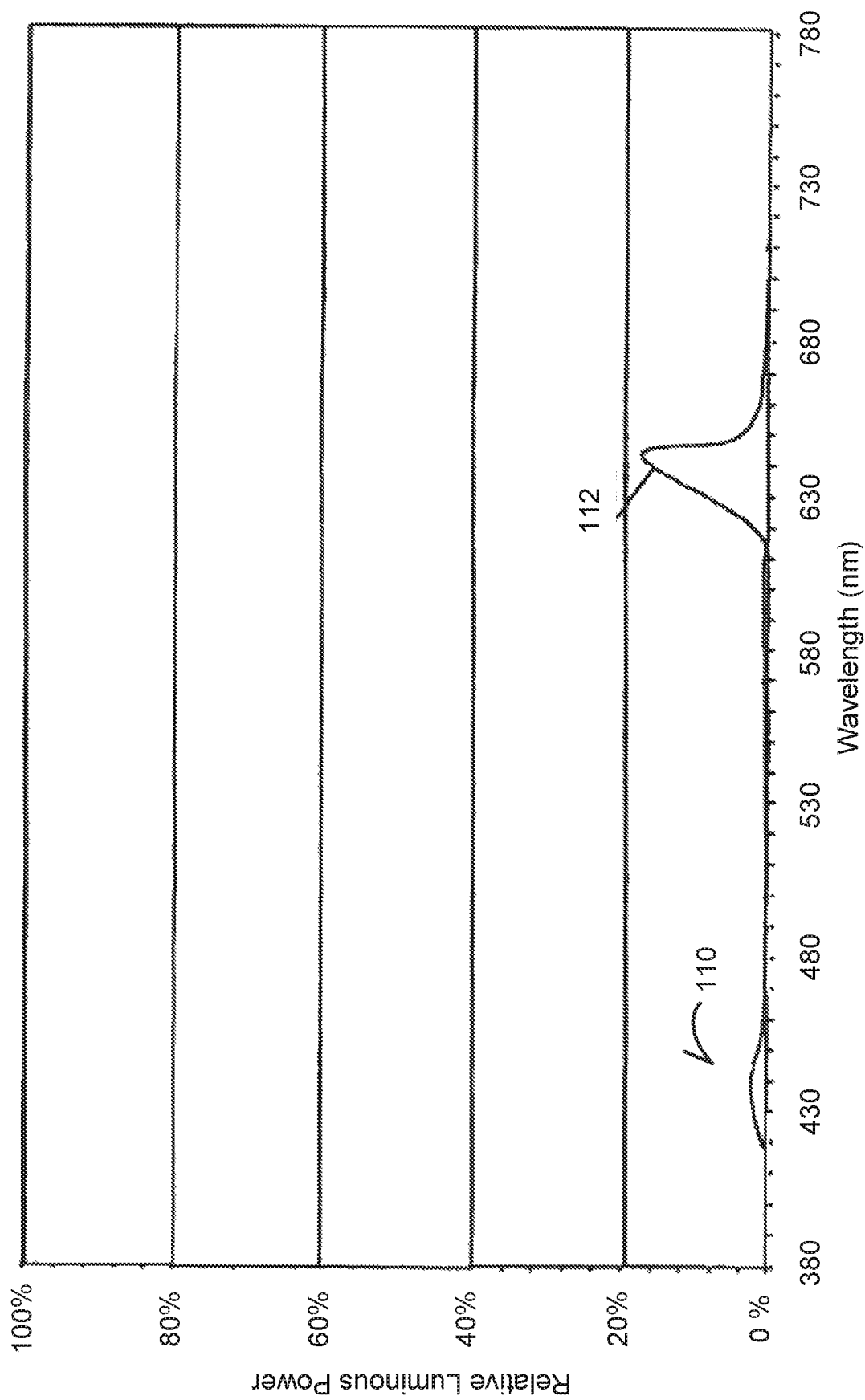
FIG. 6B is a graph showing the relative luminous power for wavelengths when a lighting device has a spectral output at 5% intensity.

FIGS. 6A and 6B show an exemplary spectra output from this driving circuitry. In this embodiment the first group of LEDs 84 include LEDs having a spectral content at 450 nm and a separate spectral output at 640 nm with greater relative luminous power provided for the 640 nm LEDs compared to the 450 nm LEDs. As shown a local peak 110 of relative luminous power is provided at 450 nm while a second greater local peak 112 of relative luminous power is provided at 640 nm. Even when dimmed to 5% these local peaks 110 and 112 are still provided.

Figure 7:
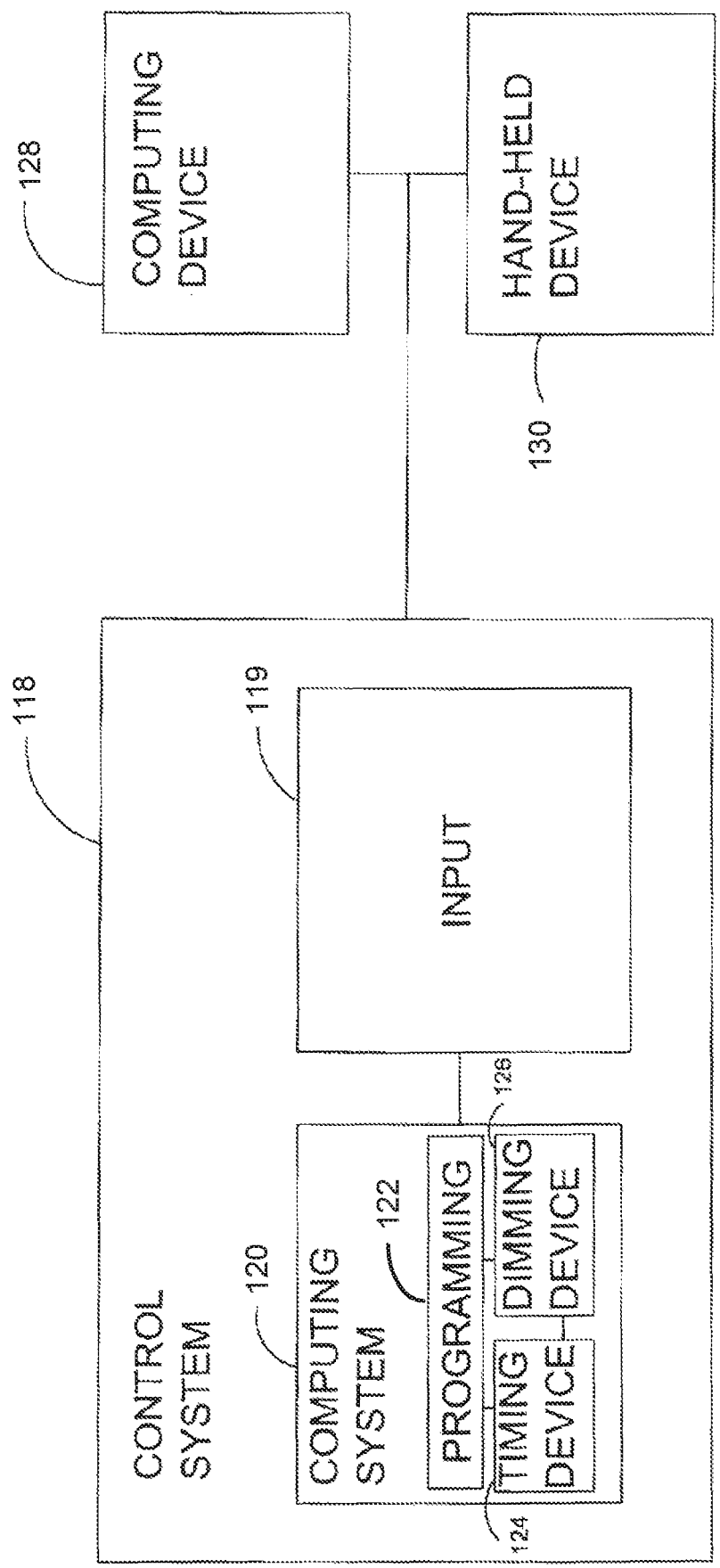
FIG. 7 is a schematic diagram of a control system for a lighting device.

A control system 118 is provided in FIG. 7 and is electronically connected to the lighting devices 60, and in an embodiment is the control unit 6 of the incubation chamber 1. The control system 118 includes an input 119 for actuating a computing system 120 having programming 122 therein associated with a timing device 124. The control system 118 additionally controls the dimming device 108 that is electrically connected to the timing device 124 such that the programming 122 at predetermined periods automatically dims the lighting assemblies 38 to a predetermined light setting. In this manner the control system 118 actuates the lighting devices 60 to provide pre-determined periods of light and dark during a 24-hour cycle.

The control system 118 in one embodiment communicates remotely through over the air communications, via Wi-Fi or other protocols as is known in the art to provide lighting and dimming information to an individual having a remote computing device 128 or handheld device 130 having the capability to receive such communication. In an embodiment the computing device 128 or handheld device 130 may be used to communicate instructions to the control system 118 such that the control system 118 is remotely controlled by the remote device 128 or handheld device 130. Examples of the remote devices include but are not limited to computers, laptop computers, tablet computers, smartphones, remote controls and the like.

Thus, in operation the control system 118 is programmed to provide not only predetermined wavelengths or colors, in addition the timing device 124 sets predetermined intervals for each day. In particular, the control system 118 can provide sixteen hours of light during a day and then turn the LED groups 84 and 86 off for eight hours. Then after the eight hours, the dimming device 108 is actuated to again provide light. The programming 122 can additionally be configured to then vary the predetermined periods of time, including first and second incubation periods of time and daily periods of time. Thus, for a first incubation period, such as the first fifteen days of incubation, no light is provided. Then for a second incubation period, such as for days 16-21 of incubation, the predetermined daily time period can go to a different daily predetermined time period, such as sixteen hours of light and eight hours of dark wherein the light is a predetermined narrow band of wavelength, or wavelength or wavelength or wavelengths that promote hatching. Thus, during the incubation period of time each daily period of time can have different settings of dark and light.

The predetermined wavelengths, predetermined incubation periods and predetermined day periods are determined by multiple factors. This includes, but is not limited to, relative intensity of the light, egg type, including whether the egg type is species (turkey, chicken, duck, and the like), sex (broiler, layer and the like) or breed (Cobb, Ross and the like) related, hatch time, increased shell penetration and the like.

Figure 3A:
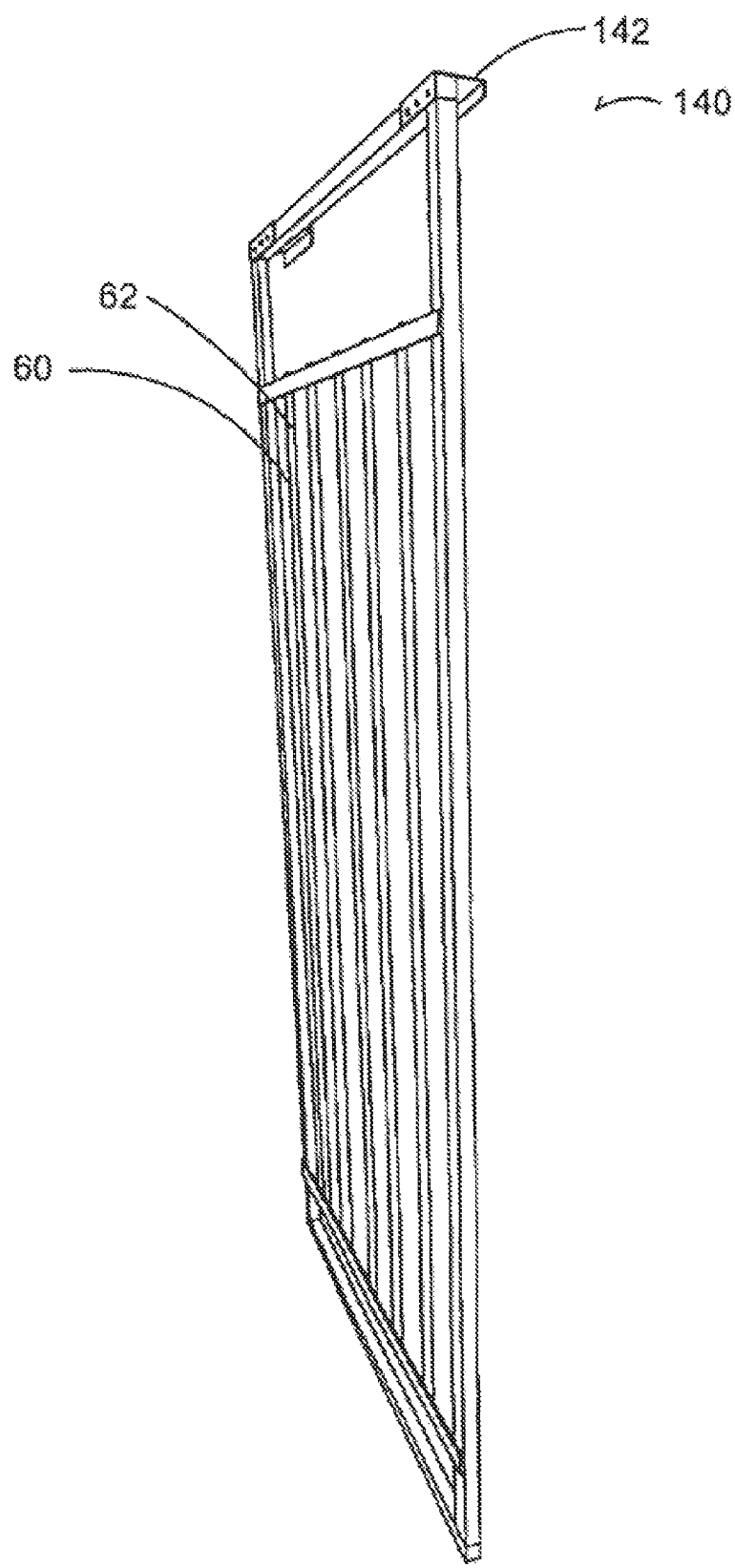
FIG. 3A is a perspective view of a light supporting device.

FIGS. 2A and 3A show an attachment system 140 is provided to removably secure the light supporting device 50 to the body 12. In one embodiment the attachment system 140 has brackets 142 that receive the upper horizontal support member 20 of the body to hang the light supporting device 50 on the body and stabilize the light supporting device 50 to prevent vertical movement of the light supporting device 50. In an example embodiment each bracket 142 is C-shaped to provide additional stability to the light supporting device 50.

Figure 3B:
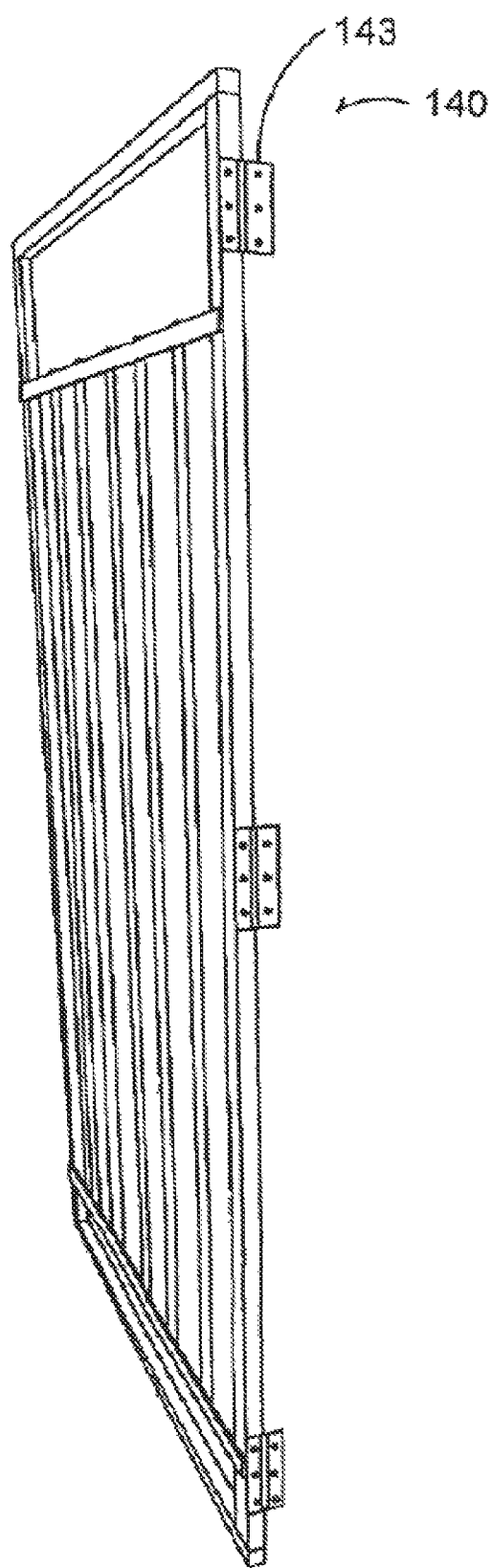
FIG. 3B is a perspective view of a light supporting device.

In another embodiment as provided in FIGS. 2B and 3B the light support device is hingedly attached to a vertical support member 14 of the body 12 with hinge members 143 to allow access to the interior cavity 24 of the body. Again, the hinge members 143 stabilize and prevent movement of the light supporting device 50 when the light supporting device 50 is adjacent the holding members 27 in a lighting position, yet allows the light supporting device 50 to be easily moved to a second non-lighting position that is not adjacent the holding members 27. To provide additional stability a magnetic device engages is secured to the light support device 50 and engages the body to hold the light supporting device 50 in place. The magnetic bond between the magnetic device and body is such that it holds light supporting device 50 in place, yet is easily overcome by as a result of a worker pulling on the light supporting device.

Figure 2C:
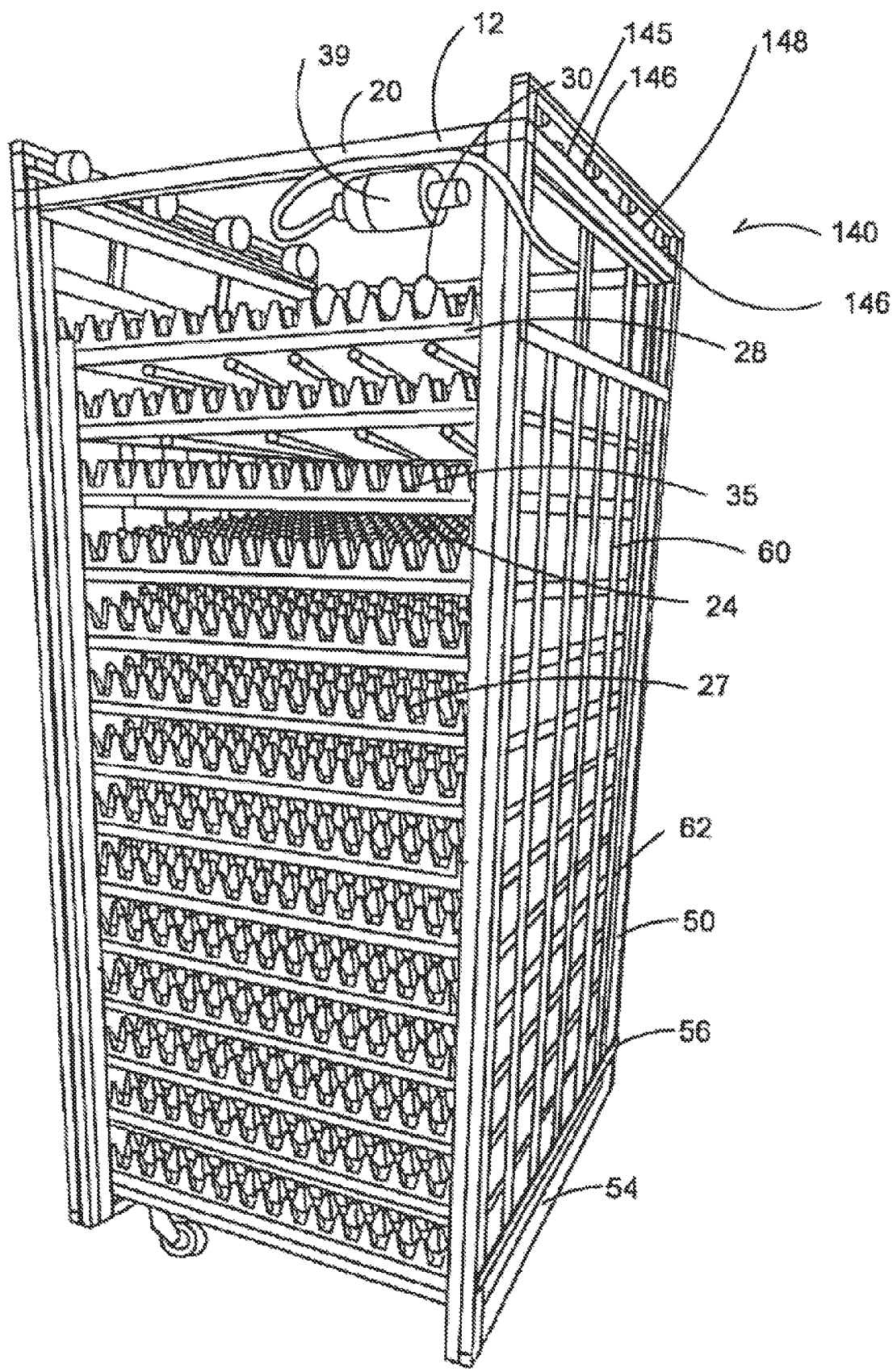
FIG. 2C is a perspective view of a setter incubation device with a light supporting device secured thereto.
Figure 3C:
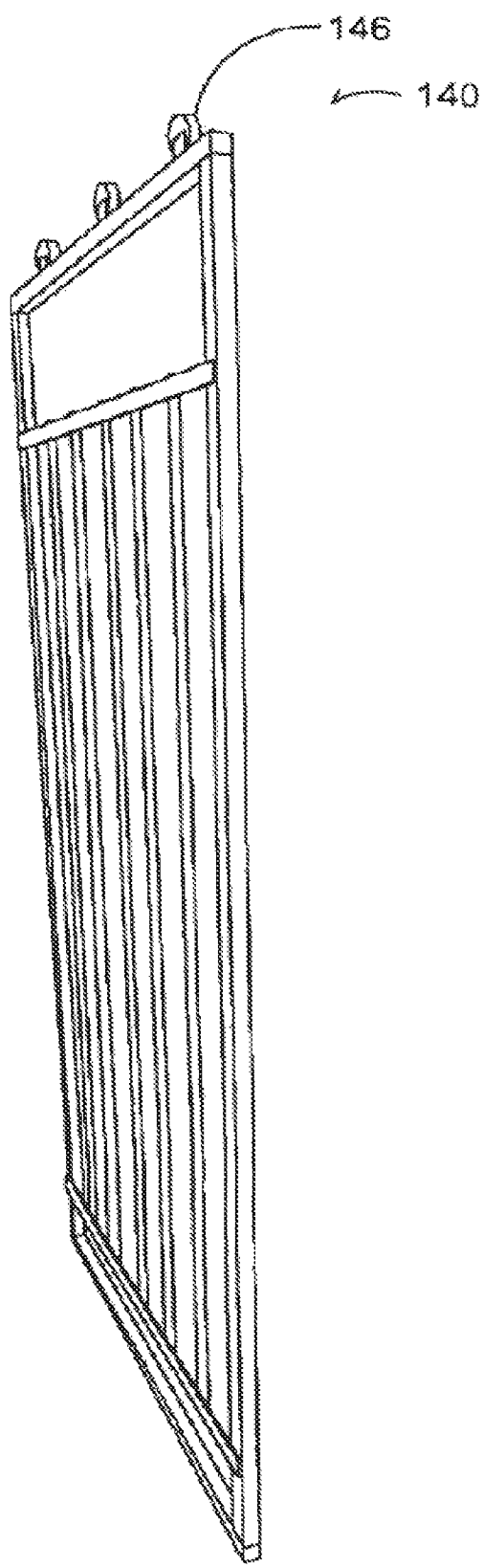
FIG. 3C is a perspective view of a light supporting device.

In another embodiment, as shown in FIGS. 2C and 3C, rail elements 144 are secured to the body 12 such that the light support device 50 is slidably moved from aligned with the body 12 to the side to allow access to the interior cavity 24. In particular, track members 145 are secured to the horizontal support members 20 and corresponding rolling elements 146 are secured to the light supporting device 50 and placed within the track members 145. Stop elements 148 are disposed within the track members 145 to prevent the rolling elements 146 from sliding out of the track members 145 when the light support device is moved from a first lighting position adjacent the holding members 27 to a second non-lighting position that is not adjacent the holding members 27.

In all embodiments the light support device 50 is able to be moved from a first position adjacent the eggs 30 to a second position that is not adjacent the eggs 30 to allow access to the interior cavity 24 of the body so that holding members 27 can easily be removed and inserted to facilitate replacement or loading and retrieval or unloading of eggs 30 into the device 10. An electric motor or device can similarly be attached to the light supporting member to automatically move the light supporting device 50 without manual force without falling outside the scope of this disclosure. In addition, contemplated is the use of multiple light supporting devices 50 including but not limited to on more than one side of the incubating device 10 to allow maximum light penetration within the interior 24 of the body 12.

Figure 4A:
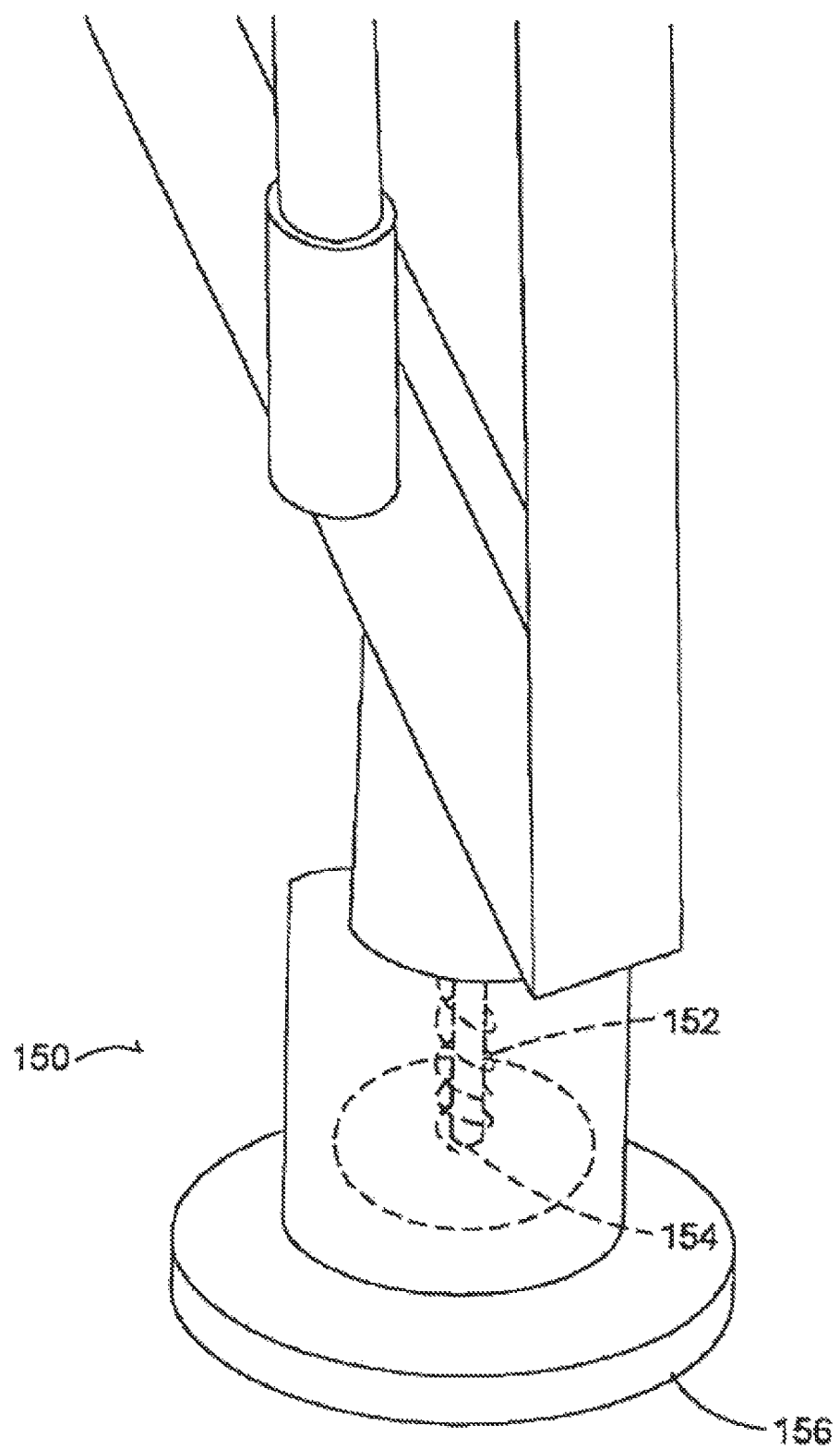
FIG. 4A is a partial perspective view of a light supporting device.
Figure 4B:
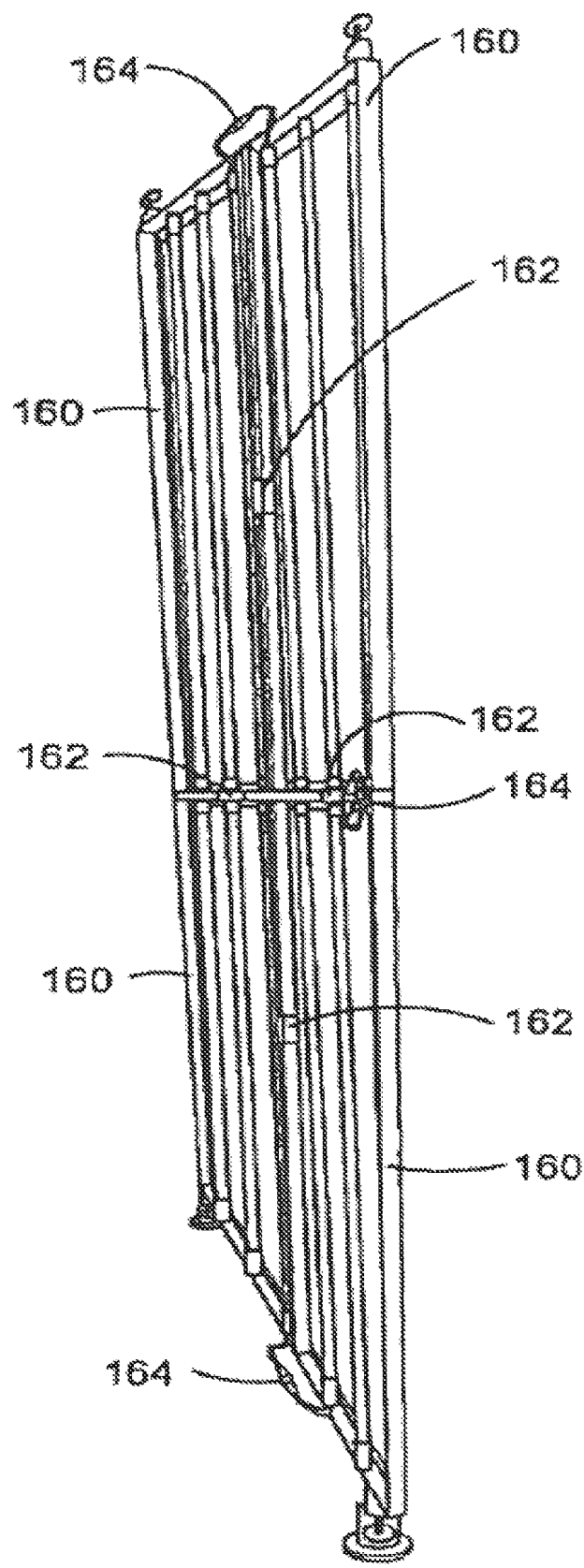
FIG. 4B is a perspective view of a multi-piece light supporting device.

In an alternative embodiment as shown in FIGS. 4A-4B the attachment system 140 does not secure the light supporting device 50 to the body 12 and instead is secured within the incubation chamber 10. In an embodiment the light supporting device has foot members 150 that engage the floor of the incubation chamber 10. In an embodiment the foot members 150 are secured to the floor through a fastener such as a bolt or the like and receives a vertical support member 52 of the light supporting device 50 to hold the lighting device 50 in a predetermined position to maximize the amount of light going into the interior cavity 24 of the body.

In an embodiment the foot members 150 are adjustable in height, either through a spring element 152 that is positioned between the vertical support member 52 and the floor to urge the vertical support member against the ceiling of the incubation chamber 1 to hold the light supporting device 50 in place in spaced relation to the body 12. Alternatively, the foot member 150 comprises a screw element 154 that increases in height as rotated to again compress and hold in place the light supporting device 50 between the ceiling and floor of the incubation chamber 1.

In an embodiment shoe members 156 are secured to the floor of the incubation chamber at pre-determined locations and are of size and shape to receive and secure the foot member 150 of the light supporting device 50 therein. In this manner the light supporting device 50 is quickly inserted into the shoe member 156 by sliding the foot member 150 therein to correctly position the light supporting device 50. The height of the foot members 150 is then adjusted to hold the light supporting device 50 in place. When removal is needed the foot member 150 is lowered in height and the light supporting device 50 is easily and quickly removed so a worker can quickly gain access to the fan element or other elements behind the light supporting device 50 to ensure the light supporting device 50 while spaced apart from the body 12 remains in close proximity to the body 12 to maximize light coverage within the interior cavity 24 of the body 12 and on the eggs 30 therein.

The predetermined location of the shoe members 156 in one embodiment is between the rail element 9 and the fan element 5. In this manner the rail element 9 protects the light supporting device 50 from contact with an incubation device 10 as it is rolled or inserted into the incubation chamber 1 preventing potential damage to the lighting devices 60. In addition, this places the lighting devices 60 in front of the fan element 5 and in an embodiment wherein the lighting elements 70 are directional and reflective material is utilized, all light emitted by the lighting devices 60 is directed away from the fan element 5. Thus the reflection of light off of the fan element 5 causing periodic or flickering light that has been shown to have negative effects on incubated eggs is reduced, eliminated and avoided preventing negative biological responses within the eggs 30.

Figure 8:
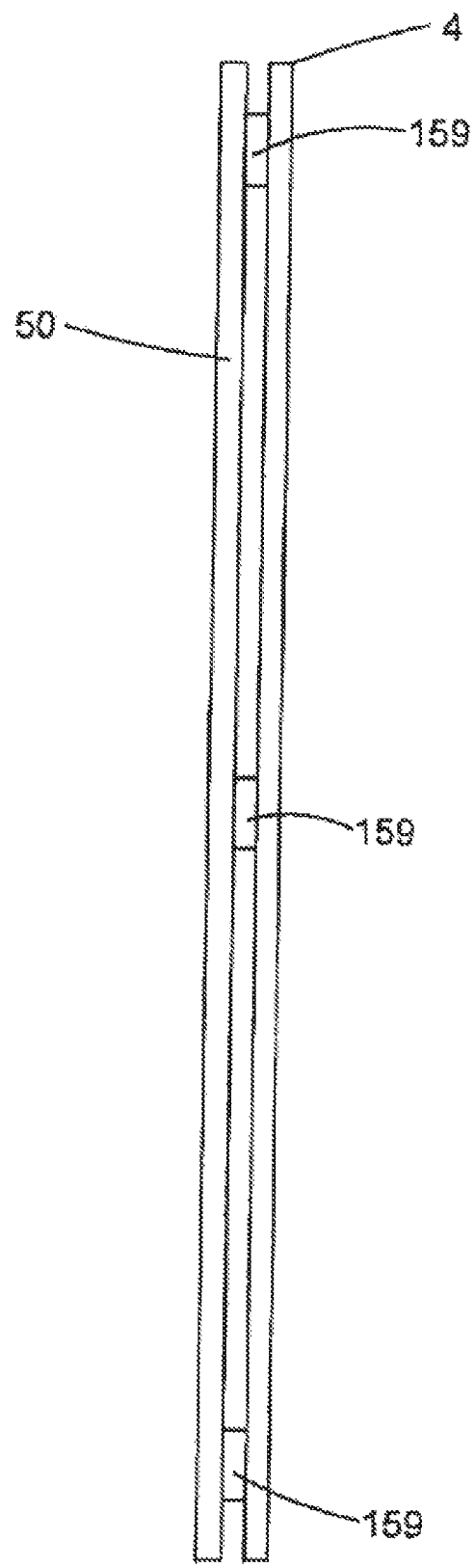
FIG. 8 is a partial plan view of a light supporting device within an incubation chamber.

In another embodiment as shown in FIG. 8 the light supporting device 50 has an attachment system 140 that secures the light supporting device 50 to an auxiliary device within the incubation chamber 1 such as the temperature control member 4, the fan element 5 or a rail element 9. In these embodiments, the attachment systems can include but are not limited to magnetic attachment, spring loaded attachment members, fasteners, clips, or the like.

In the embodiment of FIG. 8 the rest of the incubation chamber 1 is not shown and only the temperature control member 4 with the attachment system that is a magnetic attachment 159 to the light supporting device 50 is shown. In other embodiments the light supporting device 50 directly engages the auxiliary device 4 or 5. Either way the close proximity of the lighting devices 60 to the auxiliary devices 4 and 5 allow heat to transfer from the lighting devices 60 to the auxiliary devices 4 or 5 to regulate temperature within the incubation chamber 1.

Figure 9:
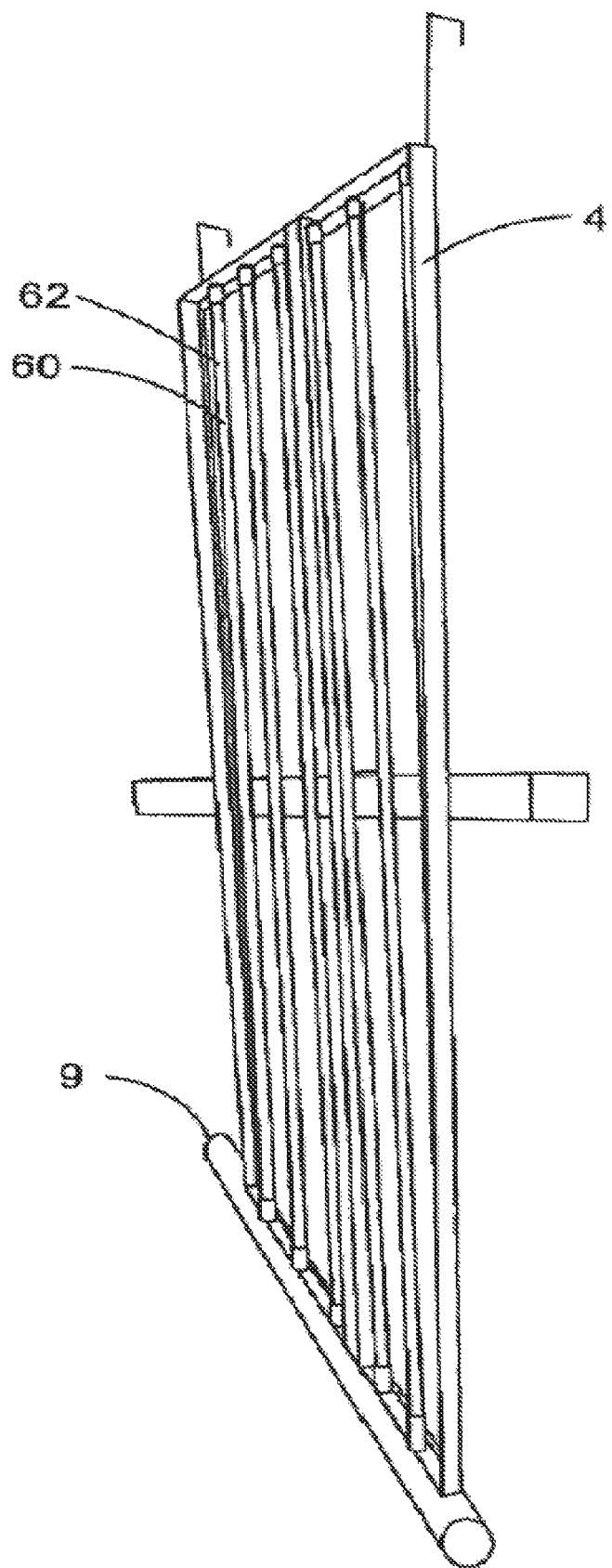
FIG. 9 is a partial perspective view of a light supporting device within an incubation chamber.

FIG. 9 shows yet another embodiment within the incubation chamber 1 wherein the light supporting device 50 engages and sits on rail element 9 and engages the side rail of the incubation chamber 1. Again, the rest of the incubation chamber is not shown for ease of seeing engagement points. This light supporting device 50 utilizes hook elements that hook into the incubation chamber 1.

The light supporting device 50 is removable or secured in such a way that it can be inserted and removed quickly and easily. In an embodiment where the light supporting device 50 is secured to the temperature control member 4, heat from the light supporting device 50 is directed to the temperature control member 4 through engagement of the lighting device 60, substrate 66 or heat sink to the temperature control member 4 or alternatively through use of a heat conveying conduit. The temperature control member 4 is then controlled by the control unit 6 to ensure the proper temperature within the chamber 1. By contacting the temperature control member 4 less variance in heat through the chamber is accomplished minimizing the effect of the heat generated by the lighting devices 60. In addition, by securing the light supporting device to and/or in front of the fan element 5 and using directional light elements and reflective material, periodic/flickering reflected light is reduced, eliminated and avoided preventing negative biological responses within the eggs 30.

FIG. 4B shows yet another embodiment of the lighting device 50. In this embodiment the lighting device is comprised of multiple interlocking sections 160. Each section 160 has its own set of lighting devices 60 and is of size and shape to encompass a predetermined area within the interior cavity 24 of the body 12. Each section 160 has an interlocking mechanism 162 to detachably secure to the other sections at predetermined points of connection. When each section 160 is connected to another section 162 a light supporting device 50 is formed that is of size and shape to irradiate the eggs in the interior cavity 24 from a single side of the body 12. Electrical connectors 164 connect wiring 56 from the individual lighting devices 60 of each section 160 to the lighting devices 60 of another section in a waterproof manner. In this way the lighting devices 60 of all of the sections 160 are electrically connected and controlled by a single control unit 6 after they are interconnected. By having individual sections 160, the sections are easier to handle allowing for faster and easier installation and removal. In addition, by making the connectors 164 waterproof the light support device 50 can be cleaned during a cleaning of the incubation chamber 1.

In yet another embodiment the light supporting device 50 is built into the incubation chamber 1 itself similar to the fan element 5 and temperature control member 4 without falling outside the scope of this disclosure. This is as one-piece construction with the incubation chamber 1 or otherwise. In particular, during construction of the incubation chamber 1 the light supporting device 50 is made a permanent fixture with the incubation chamber 1 and positioned to align the lighting devices 60 adjacent to the incubation devices 10 such that when all of the incubation devices 10 are within the incubation chamber 1 the light supporting devices 50 are adjacent the incubation devices 10 in a lighting position. In addition, by positioning the light supporting device 50 in front of the fan element 5 and using directional light elements and reflective material, periodic/flickering reflected light is reduced, eliminated and avoided preventing negative biological responses within the eggs 30.

In operation, in one embodiment the light supporting device 50 is attached to the body 12 of the incubating device 10 or secured with an incubation chamber 1. In particular, in the embodiment where the light supporting device 50 is attached to the incubating device 10 the attachment system 140 engages the body 12 to position the lighting devices 60 in spaced relation to the eggs 30 in the interior cavity 24 of the body to distribute light throughout the interior cavity 24. At this time the light supporting device 50 is considered in a lighting position. Because of the directional lighting sources and size and shape of the light supporting device 50, the body 12 of the incubating device 10 causes minimal interference to enhance the light output on the eggs 30 within the volume of the interior cavity 24. At this point more than half of the interior volume of the incubation device 10 is illuminated by the lighting devices 60 of the light supporting device 50.

When the eggs 30 are ready for hatching the incubation devices 10 are removed from the incubation chamber 10 and the light supporting device 50 is removed from being adjacent from the incubation device 10 such that if operating light would not penetrate more than half of the volume of the interior cavity 24 of the incubating device. At this point the light supporting device 50 is considered in a non-lighting position. This is accomplished by either pulling the light supporting device 50 off the body 12, sliding it away from the body 12, hingedly pivoting the light supporting device 50 or otherwise to provide access to the holding members 27 in the interior cavity 24 of the incubating device 10. The holding members 27 are then removed and taken to a hatching device or another location and new holding members 27 containing eggs 30 are inserted into the incubating device 10. The light supporting device 50 is then placed back adjacent the interior cavity 24 to its lighting position. If cleaning is desired, the light supporting device 50 can be removed for cleaning purposes or left on the incubating device because the lighting devices 60 and electrical connections are waterproofed to withstand a power washing device.

In an embodiment where the light supporting device 50 is not attached to the incubation device 10, prior to inserting the incubation device 12 into a chamber 10 the light supporting device 50 is installed by securing the device between the ceiling and floor of the incubation chamber 10 or to an auxiliary device within the incubation chamber such as a fan element 5, a temperature control member 4 a rail element 9, or the like or a combination of these. This can include, but is not limited to inserting foot members 150 of the light supporting device 50 into shoe members 156 and pushing the light supporting device in place, then adjusting the foot members 150 to compress the light supporting device 50 between the ceiling and floor of the incubation chamber 10 to prevent movement of the light supporting device 50. Once installed, the incubation devices 10 are inserted and removed from the incubation chamber 1 as desired and the lighting devices 60 irradiate the eggs 30 from a location spaced apart from the incubation devices 10. Still, through use of directional lighting, the light supporting device 50 design and the positioning of the light supporting device 50 within the incubation chamber 1 the light supporting device 50 is in a lighting position to irradiate in a narrow wavelength for predetermined periods of time the eggs 30 in the interior cavity 24 to promote biological responses within the eggs 30 such as increase hatchability and sex selection. The light supporting device 50 thus does not need to be removed and additionally, because of water proofing of the light supporting device, can be washed as desired.

In one embodiment the lighting devices 60 are operating for predetermined time intervals for a pre-determined period at a predetermined wavelength. In one embodiment the pre-determined time interval is 16 hours of light with 8 hours of dark. In another embodiment the pre-determined period is between days 16 and 21 of incubation and the predetermined wavelength is between either 430 nm-470 nm or 620 nm-660 nm. These ranges are for example only and other predetermined wavelengths, including wavelengths not visible to humans from 300 nm to 800 nm, and predetermined periods and predetermined time intervals including as short as milliseconds can vary without falling outside the scope of this disclosure.

In a trial conducted by applicant, applicant provided lighting devices 60 with a lighting treatment having predetermined wavelengths with local peaks 110 and 112 at 450 nm and 640 nm distributed as shown in FIG. 6A for sixteen hours a day during days 16-21 of incubation. Over many trial periods with many different egg types the hatchability of eggs was improved on average over 6% compared to eggs not receiving a lighting treatment during incubation (75.9% or 34,014 of 44,820 hatched having a light treatment vs. 69.8% or 31,554 of 45,180 not having a light treatment). Egg types included, but are not limited to cobb broilers, ross broilers, prime broilers, red rangers, special blacks, ISA blacks and the like. Thus applicant has shown that hatchability is promoted by lighting treatments of the lighting devices 60. In addition, because hatching is promoted using a lighting treatment having a predetermined period of only 5 days or during the 16-21 day period a lighting treatment does not need to occur for the full 21 day incubation period to promote hatching, thereby reducing the amount of electricity needed to promote hatching.

Further, by controlling the narrow band of light and the photoperiod, overall hatching time is reduced. Specifically, typically from the time the first incubated egg hatches to the time the last egg in that same group hatches can be up to 48 hours of time. This means eggs must be removed well in advance to hatching, decreasing the full incubation time and making the process longer and unpredictable. By controlling the wavelength and photoperiod the overall hatching period is reduced from up to 48 hours to less than 8 hours. By reducing the hatching period efficiencies are improved, eggs 30 are in an incubation period for a more appropriate amount of time and overall egg production is increased.

In addition, by having the light supporting device 50 aligned with the body 12 and particularly holding members 27 light is evenly dispersed throughout the interior cavity 24 to maximize effectiveness. Similarly, by aligning the auxiliary horizontal support members 56 and the edge of a holding member 27 again light is not blocked by the horizontal support members 56 allowing maximum coverage by the light supporting device 50. In addition, as a result of the light supporting device 50 being movable, holding members 27 are easily removed and inserted minimizing the effect on production time.

As a result of using and the arrangement of the driving components 68 a minimal amount of driving components 68 are utilized minimizing heat output by the lighting devices 60. In addition, as a result of using directional LEDs 70, the lighting devices 60 are secured to the light supporting device in spaced relation to the holding members 27, minimizing the amount of heat conveyed on eggs 30 within the incubating device. In this manner, the temperature in the incubation room can be maintained and individual eggs are not altered as a result of heat from the lighting devices 60 to prevent potential harm to eggs 30.

Thus presented are multiple embodiments of light supporting devices 50 that are placed in an incubation chamber to emit light of pre-determined wavelengths and for pre-determined periods to promote biological responses with the incubated eggs such as increased hatchability and sex selection. This is accomplished with minimal installation effort and in manners that minimize the effect on other aspects of a commercial incubation chamber and facility such as egg retrieval and insertion. In addition, heat is controlled to ensure deleterious effects on the eggs are not realized and the system accommodates washing and sanitation efforts by workers within a facility. Therefore, at the very least all of the problems have been overcome.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed:

1. A method of promoting a biological response within a plurality of eggs in a commercial hatchery, the method comprising:
   providing an incubation chamber for incubating a plurality of eggs within a controlled environment;
   providing an incubation device within the incubation chamber having a body with an interior cavity that houses the plurality of eggs;
   providing an auxiliary environmental device within the incubation chamber;
   attaching a light supporting device having a lighting device to the auxiliary environmental device at a predetermined location in spaced relation to the interior of the body;
   compressing the lighting support device at between a ceiling and a floor of the interior cavity of the incubation chamber at the predetermined location; and
   emitting a predetermined wavelength of light with the lighting device on the plurality of eggs to promote a biological response within the plurality of eggs.

2. The method of claim 1 further comprising the step of conveying heat from the lighting device directly to the auxiliary environmental device.

3. The method of claim 1 wherein the light irradiates all exposed surfaces of the plurality of eggs.

4. The method of claim 1 wherein the lighting devices emit a pre-determined spectrum on the plurality of eggs, wherein the pre-determined spectrum is a narrow band of wavelengths.

5. The method of claim 4 wherein the narrow band of wavelengths is between 620 nm and 660 nm.

6. The method of claim 4 wherein the narrow band of wavelengths is between 430 nm and 470 nm.

7. The method of claim 1 wherein the lighting devices comprise a plurality of directional lighting elements being light emitting diodes.

8. The method of claim 1 wherein the lighting device includes a tubular body with reflective material thereon.

9. The method of claim 1 further comprising the step of providing an adjustable foot member to align the body with the auxiliary environmental device.

10. The method of claim 1 wherein the auxiliary environmental device comprises a heater, a fan, or a temperature regulating coil.

11. A method of promoting a biological response within a plurality of eggs in a commercial hatchery, the method comprising:
    providing an incubation chamber for incubating a plurality of eggs within a controlled environment;
    positioning a light supporting device having a lighting device at a predetermined position within the incubation chamber;
    attaching the light supporting device between a rail element and an auxiliary device within the incubation chamber at the predetermined position within the incubation chamber;
    inserting an incubation device having an interior cavity that houses eggs into the incubation chamber into an incubation position that is adjacent the light supporting device;
    emitting a predetermined wavelength of light with the lighting device on the plurality of eggs to promote a biological response within the plurality of eggs;
    inserting the light supporting device into a foot member secured within the incubation chamber at the predetermined location to position the light supporting device within the incubation chamber; and
    compressing the lighting supporting device between a ceiling and a floor of the incubation chamber at the predetermined position.

12. The method of claim 11 wherein the foot member is adjustable to position the light supporting device.

13. The method of claim 11 wherein the auxiliary device is a fan element or a temperature control member.

14. The method of claim 11 wherein the light irradiates all exposed surfaces of the plurality of eggs.

15. A method of promoting a biological response within a plurality of eggs in a commercial hatchery, the method comprising:
    providing an incubation chamber for incubating a plurality of eggs within a controlled environment;
    positioning a light supporting device having a lighting device at a predetermined position within the incubation chamber, wherein the light supporting device is of one piece construction with the incubation chamber;
    attaching the light supporting device between a rail element and an auxiliary device within the incubation chamber at the predetermined position within the incubation chamber;
    inserting an incubation device having an interior cavity that houses eggs into the incubation chamber into an incubation position that is adjacent the light supporting device; and
    emitting a predetermined wavelength of light with the lighting device on the plurality of eggs to promote a biological response within the plurality of eggs.

16. The method of claim 15 further comprising inserting the light supporting device into a foot member secured within the incubation chamber, wherein the foot member is adjustable to position the light supporting device.

17. The method of claim 15 wherein the auxiliary device is a fan element or a temperature control member.

18. The method of claim 15 wherein the light irradiates all exposed surfaces of the plurality of eggs.

19. A method of installing a light supporting device within an incubation chamber for promoting a biological response within a plurality of eggs within the incubation chamber, the method comprising:
 providing the incubation chamber having a ceiling and a floor for incubating the plurality of eggs within a controlled environment;
 securing a foot member within the incubation chamber at a predetermined position;
 sliding a light supporting device having a lighting device into the foot member at the predetermined position within the incubation chamber; and
 compressing the light supporting device between the ceiling and the floor of the incubation chamber at the predetermined position such that when an incubation device is inserted into the incubation chamber the lighting device is adjacent the incubation device.

20. The method of claim 19 wherein the foot member is adjustable to compress the light supporting device between the ceiling and the floor of the incubation chamber.

21. The method of claim 19 wherein the foot member has a spring element therein that compresses the light support device between the ceiling and floor of the incubation chamber.

22. The method of claim 19 wherein the foot member has a screw member such that when rotated the foot member compresses the light supporting device between the ceiling and the floor.

23. A method of promoting a biological response within a plurality of eggs in a commercial hatchery, the method comprising:
 providing an incubation chamber for incubating a plurality of eggs within a controlled environment;
 providing a light supporting device having a lighting device at a predetermined location within the incubation chamber;
 inserting the light supporting device into a foot member secured within the incubation chamber at the predetermined location to position the light supporting device within the incubation chamber;
 inserting an incubation device having an interior cavity that houses eggs into the incubation chamber into an incubation position that is adjacent the light supporting device;
 compressing the light supporting device between a ceiling and a floor of the incubation chamber at the predetermined position such that when an incubation device is inserted into the incubation chamber the lighting device is adjacent the incubation device; and
 emitting a predetermined wavelength of light with the lighting device on the plurality of eggs to promote a biological response within the plurality of eggs.

24. The method of claim 23 wherein the foot member is adjustable to position the supporting device.

* * * * *